Figure 1:
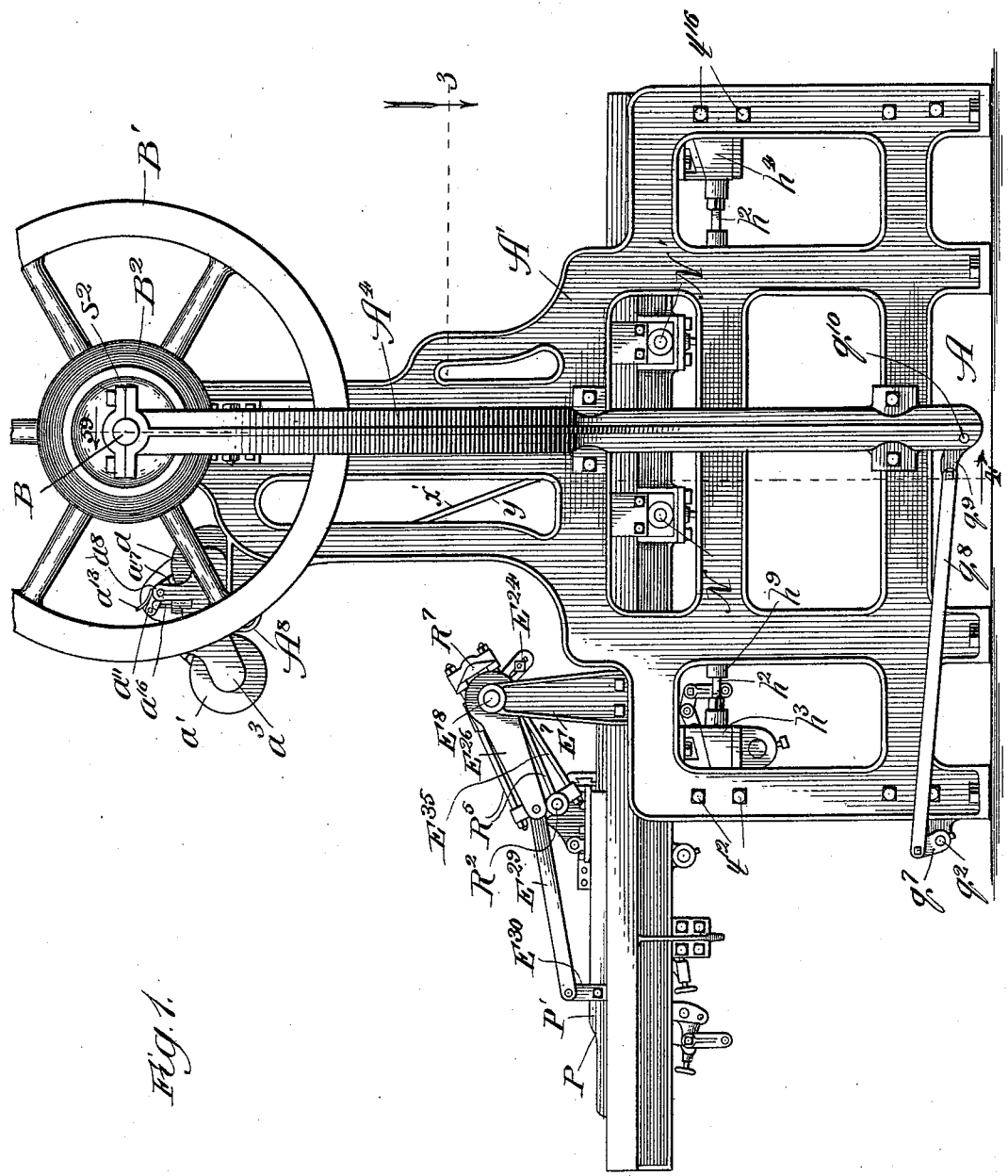

(No Model.) 17 Sheets—Sheet 1.

T. L. KNUDTSON & J. UHRI.
MACHINE FOR MAKING BOX BLANKS.

No. 518,038. Patented Apr. 10, 1894.

Witnesses:
Chas. E. Gaylord
Clifford N. White

Inventors:
Thurston L. Knudtson,
Jacob Uhri,
By Dyrenforth & Dyrenforth
Attys.

THE NATIONAL LITHOGRAPHING COMPANY,
WASHINGTON, D. C.

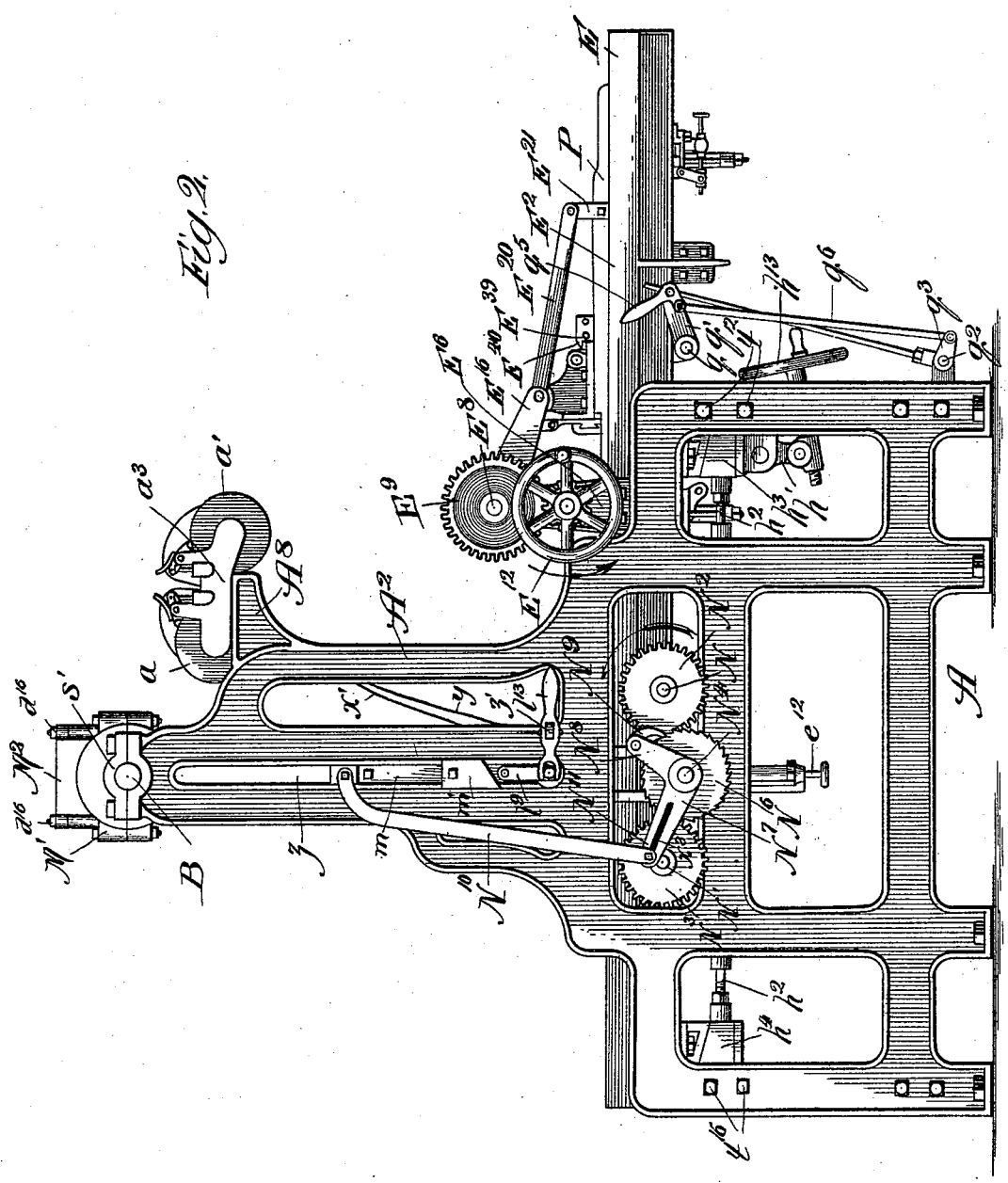

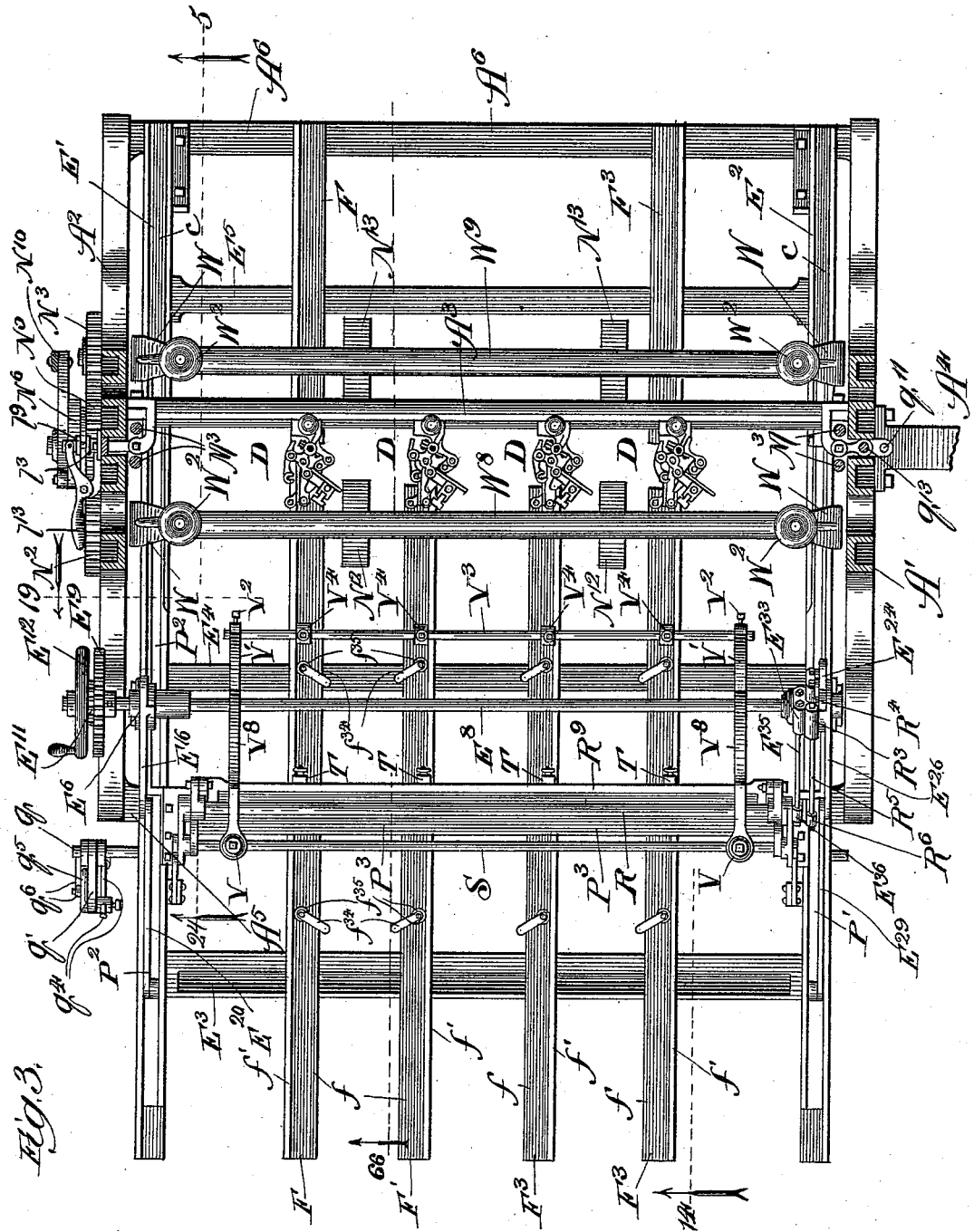

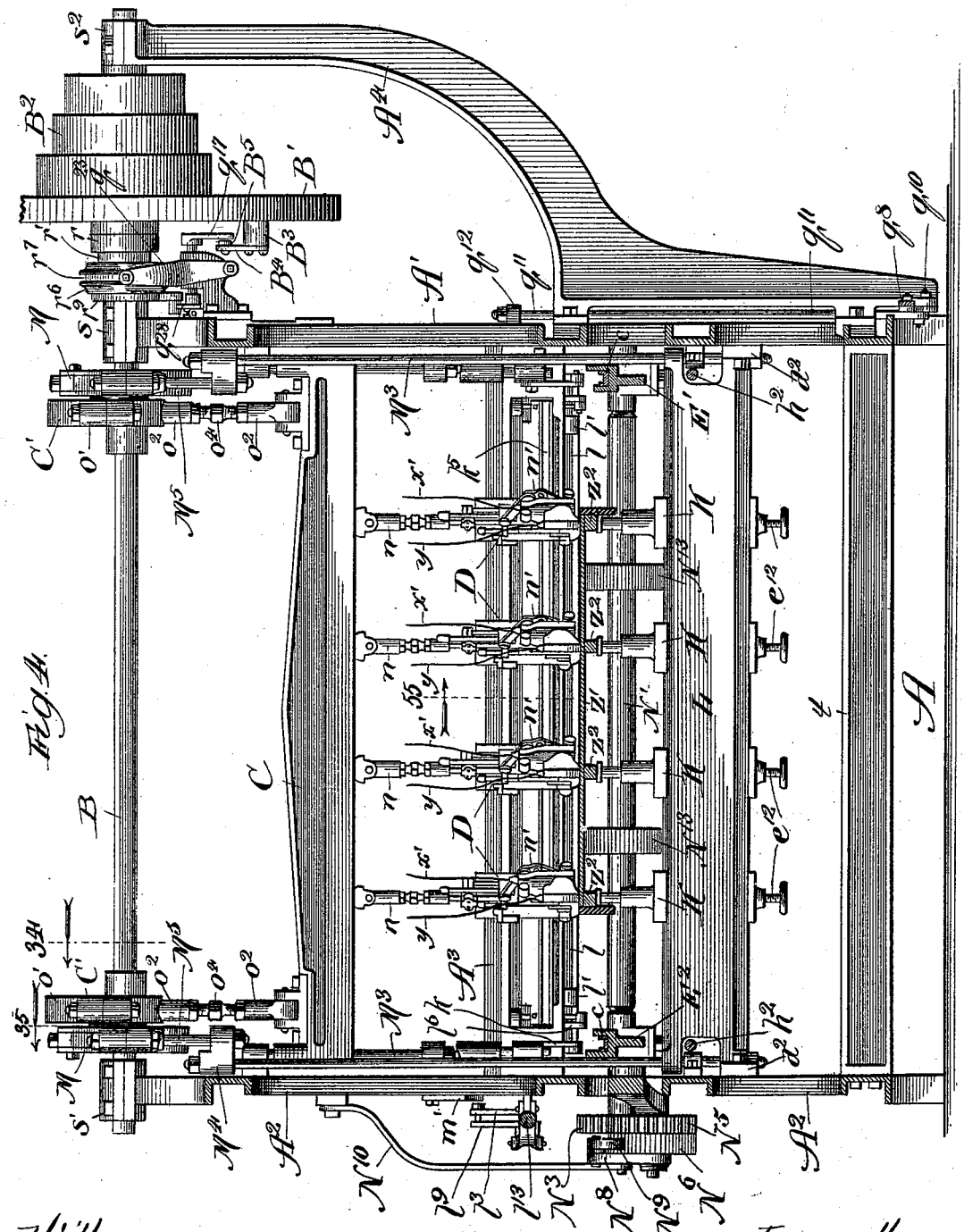

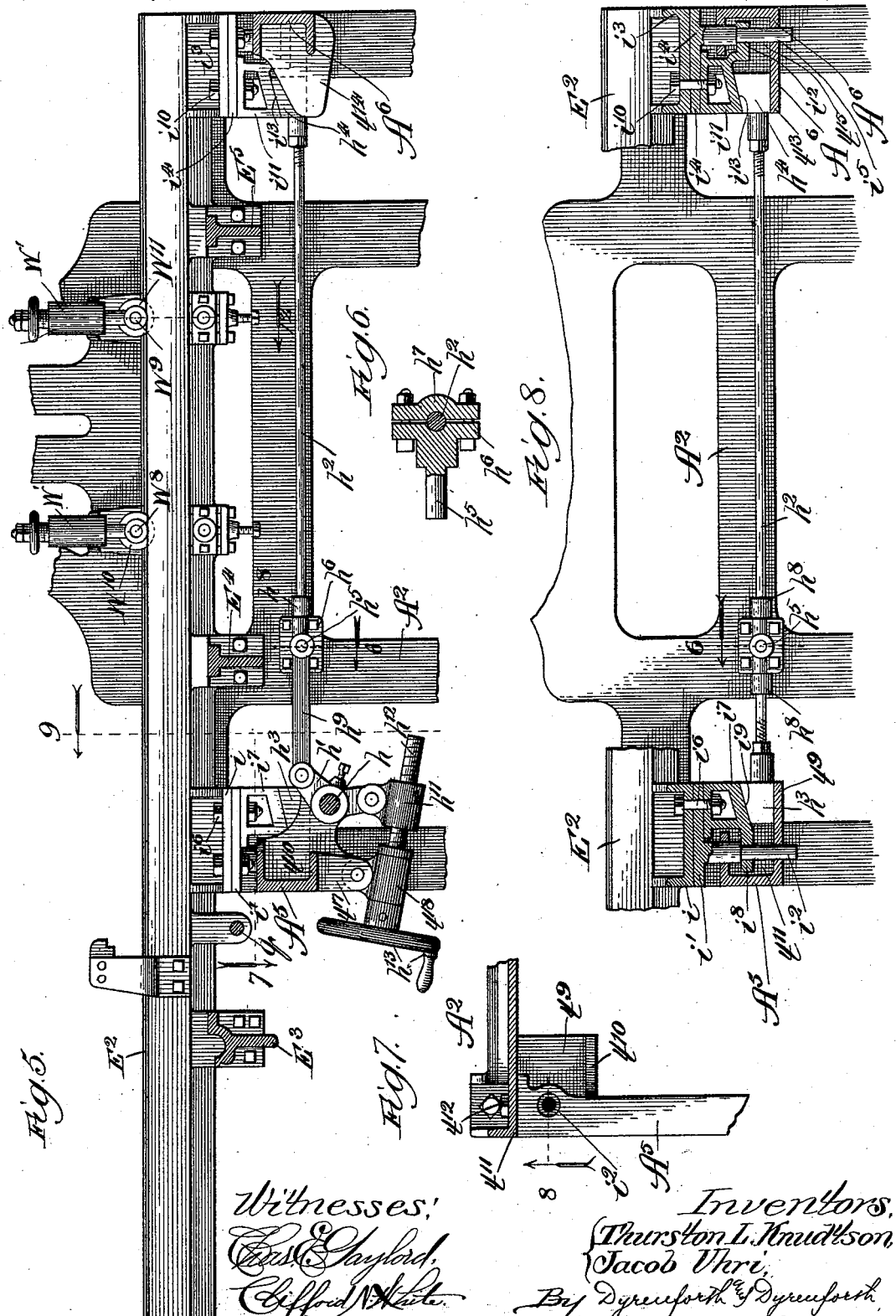

(No Model.) 17 Sheets—Sheet 6.
T. L. KNUDTSON & J. UHRI.
MACHINE FOR MAKING BOX BLANKS.
No. 518,038. Patented Apr. 10, 1894.
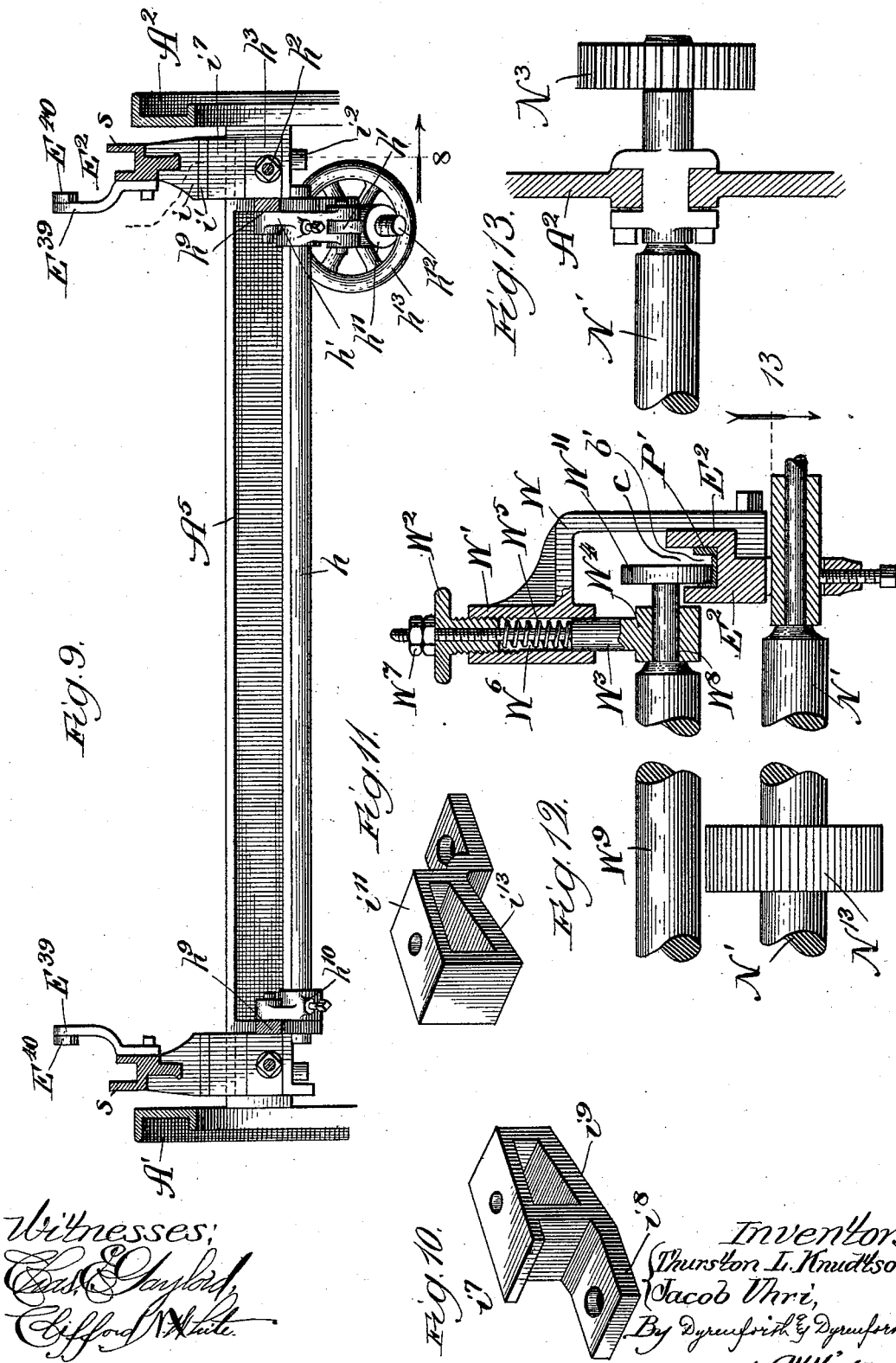

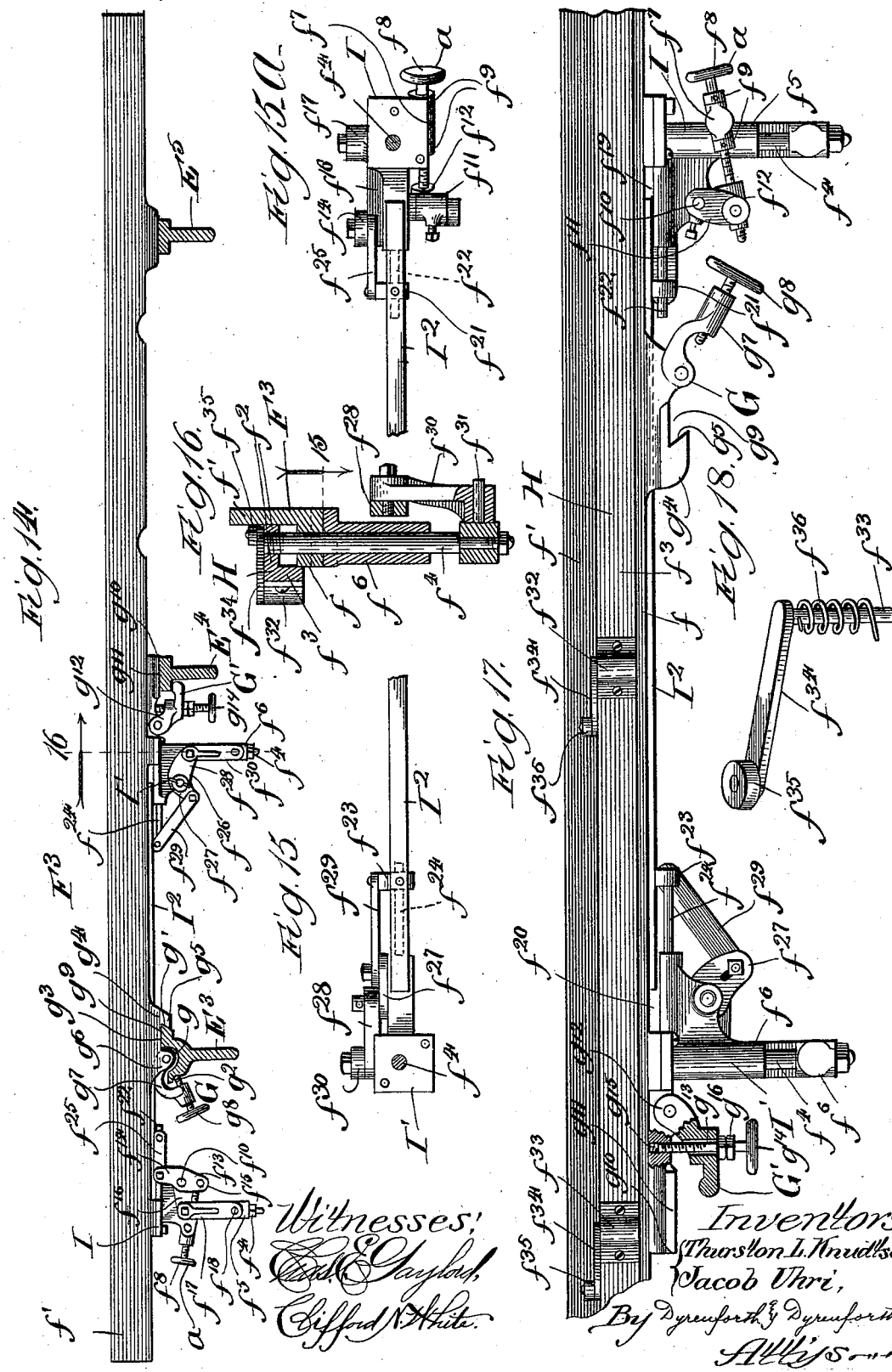

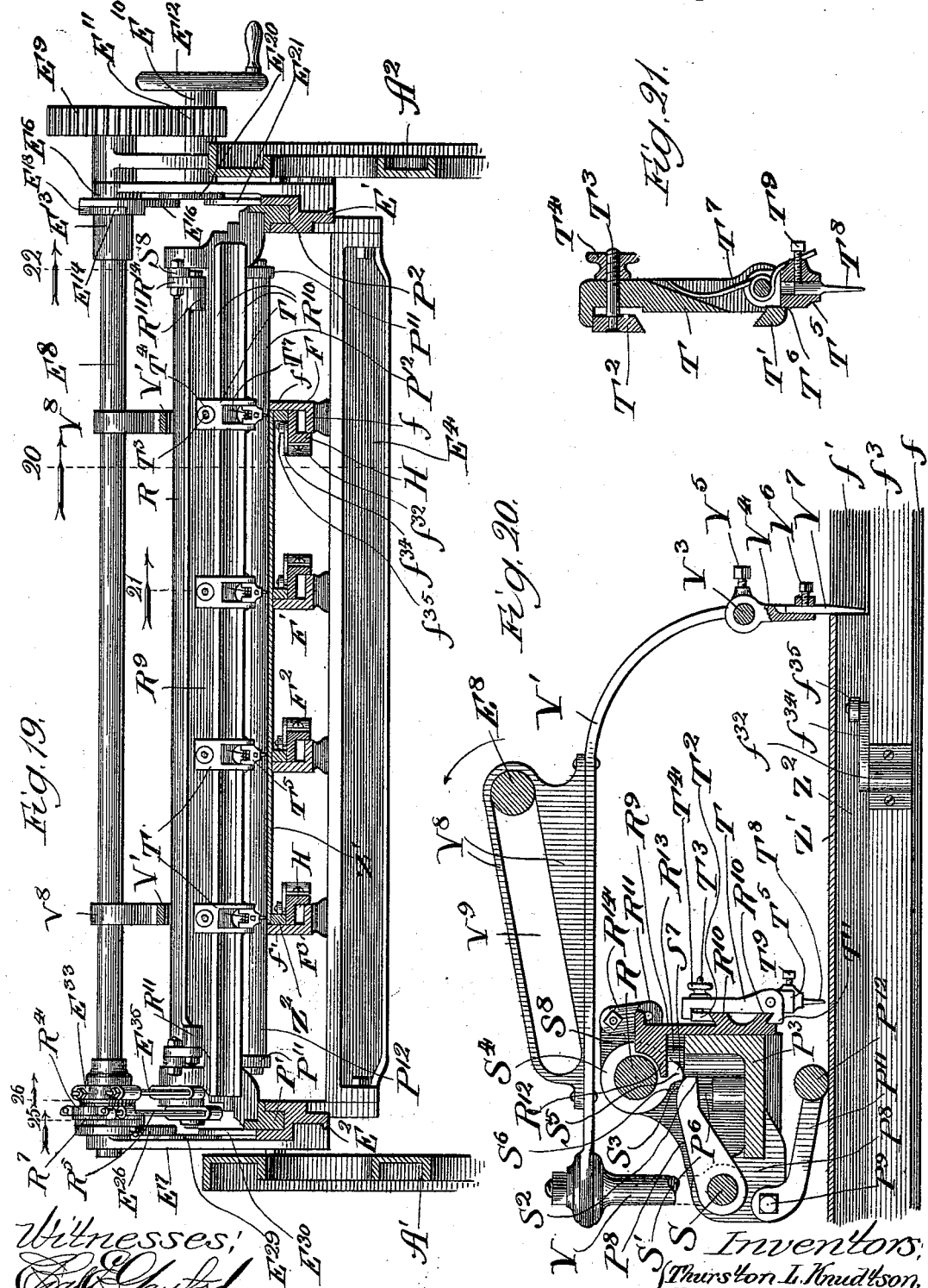

(No Model.) 17 Sheets—Sheet 9.
T. L. KNUDTSON & J. UHRI.
MACHINE FOR MAKING BOX BLANKS.
No. 518,038. Patented Apr. 10, 1894.
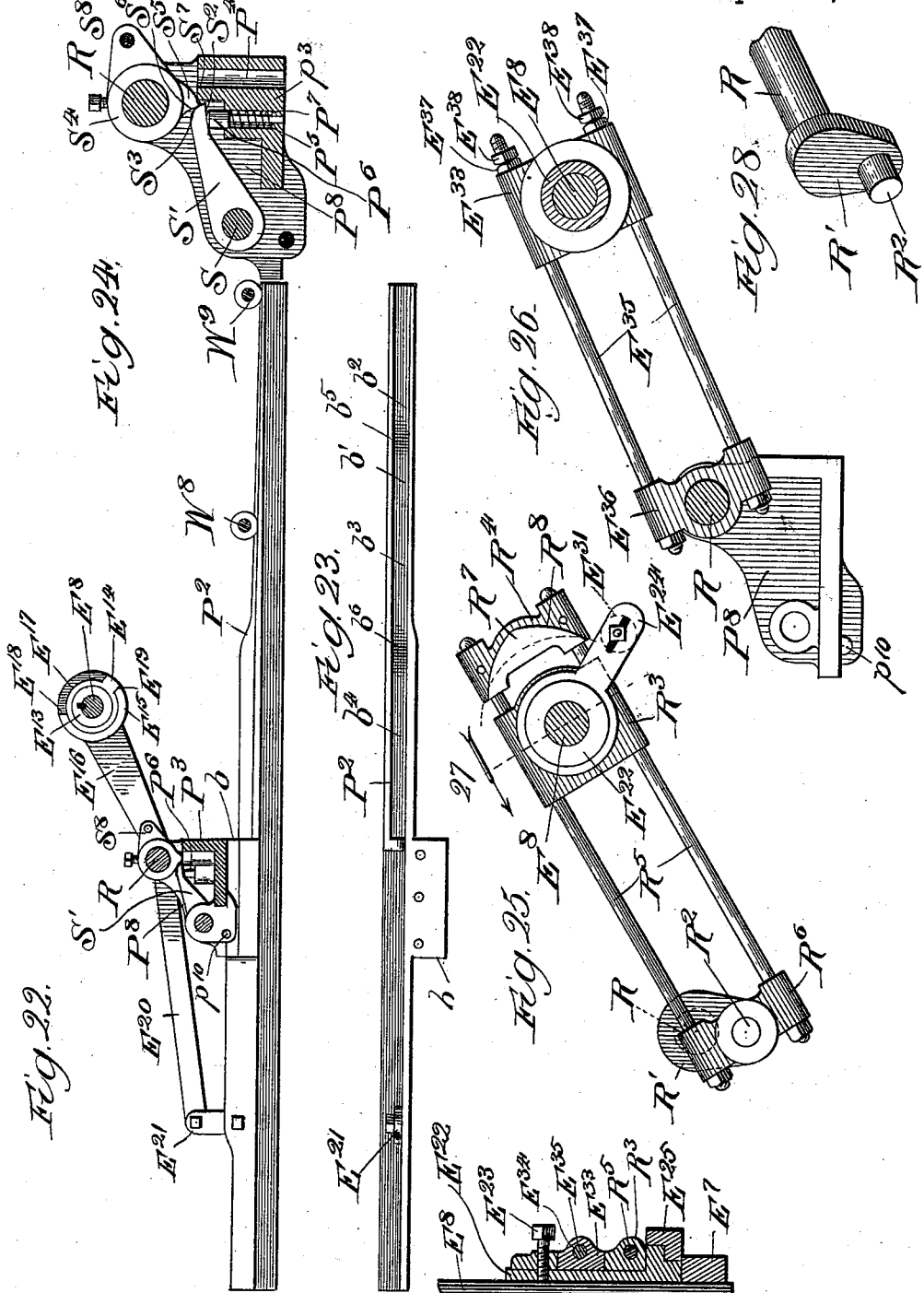

(No Model.) 17 Sheets—Sheet 10.
T. L. KNUDTSON & J. UHRI.
MACHINE FOR MAKING BOX BLANKS.
No. 518,038. Patented Apr. 10, 1894.
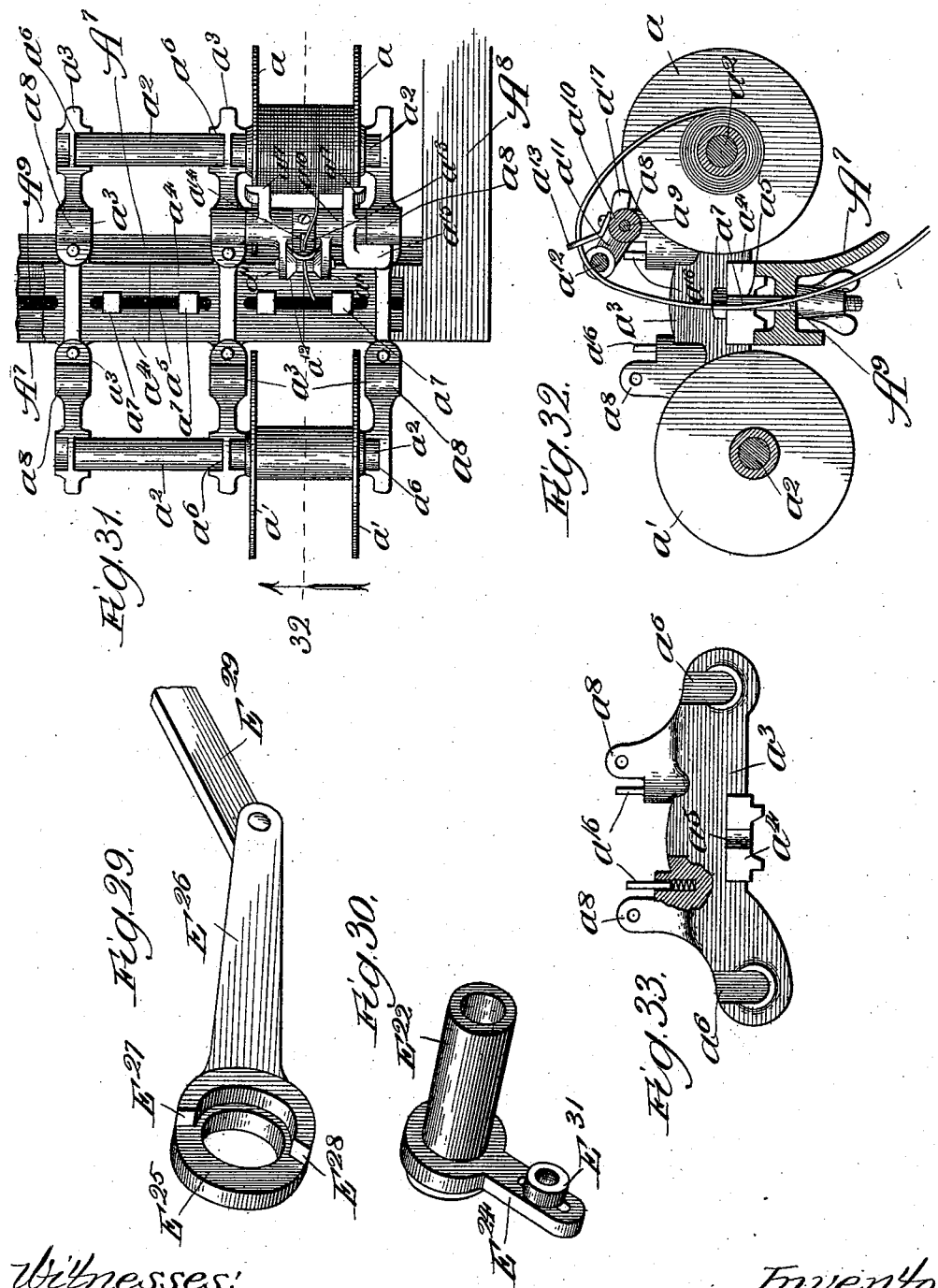
Witnesses:
Inventors:
Thurston L. Knudtson
Jacob Uhri,
By Dyrenforth & Dyrenforth
Attys (No Model.) 17 Sheets—Sheet 11.
T. L. KNUDTSON & J. UHRI.
MACHINE FOR MAKING BOX BLANKS.
No. 518,038. Patented Apr. 10, 1894.
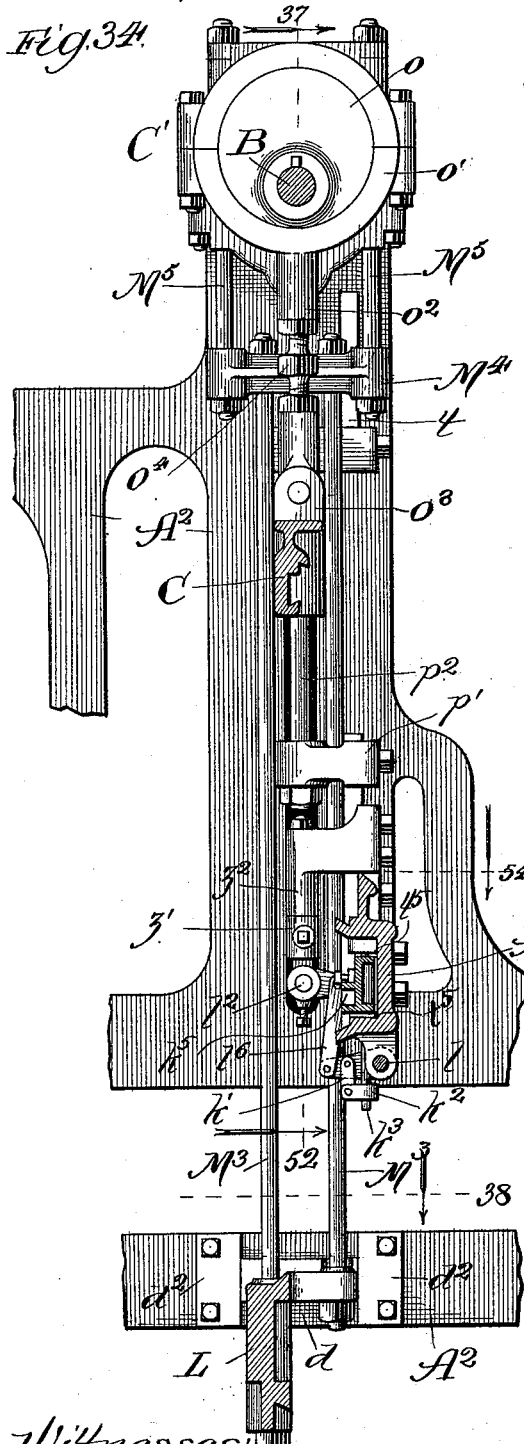
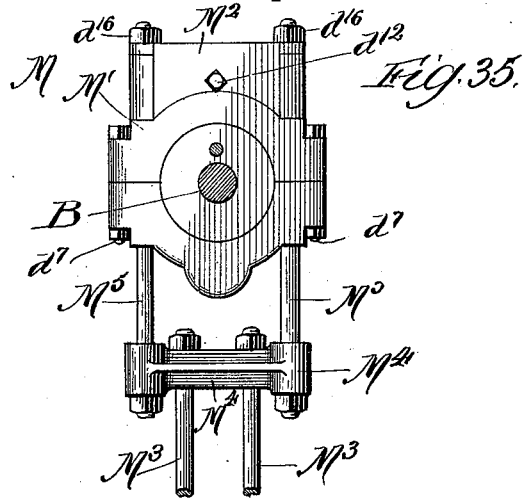
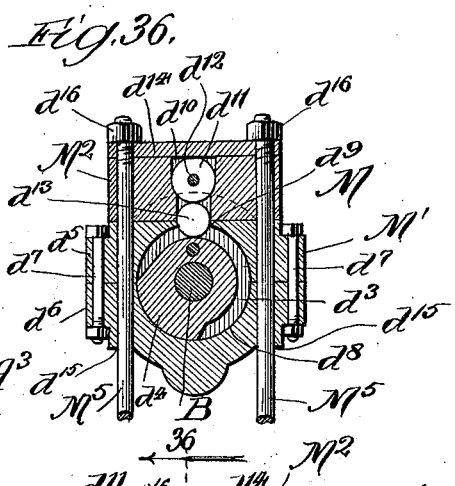
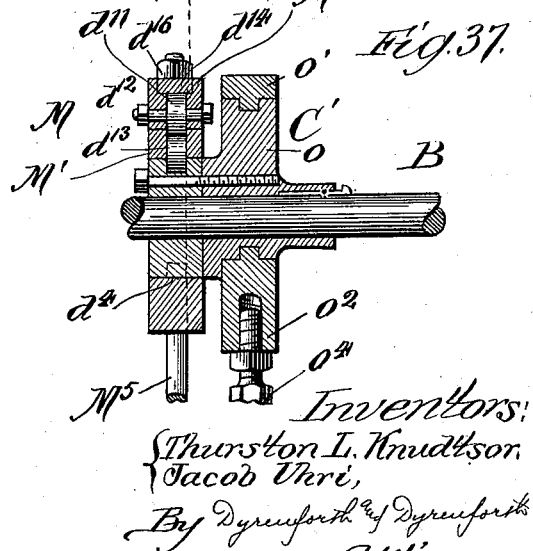
Witnesses:
Inventors:
Thurston L. Knudtson,
Jacob Uhri,
By Dyrenforth & Dyrenforth
Attys (No Model.) 17 Sheets—Sheet 12.

T. L. KNUDTSON & J. UHRI.
MACHINE FOR MAKING BOX BLANKS.

No. 518,038. Patented Apr. 10, 1894.

Witnesses:
Chas. Gaylord
Clifford N. White

Inventors,
Thurston L. Knudtson,
Jacob Uhri,
By Dyrenforth & Dyrenforth,
Attys.

(No Model.) 17 Sheets—Sheet 13.
T. L. KNUDTSON & J. UHRI.
MACHINE FOR MAKING BOX BLANKS.
No. 518,038. Patented Apr. 10, 1894.
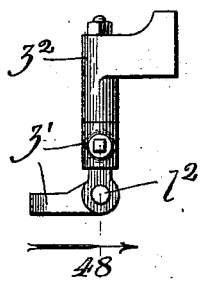
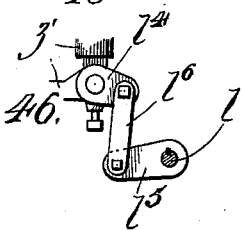
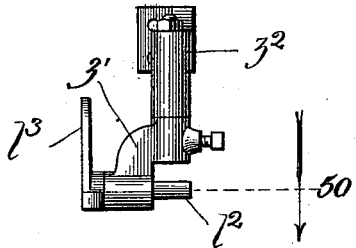
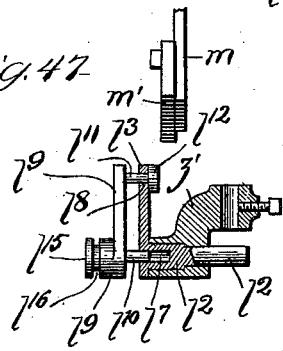
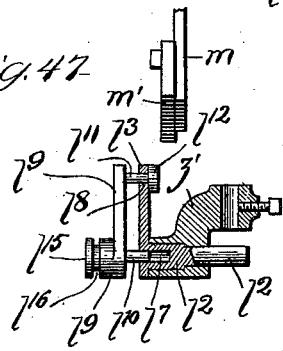
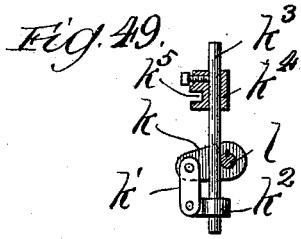
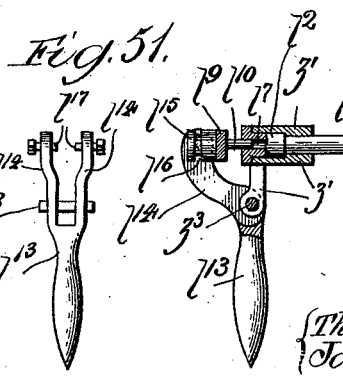
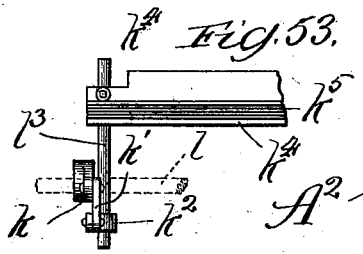
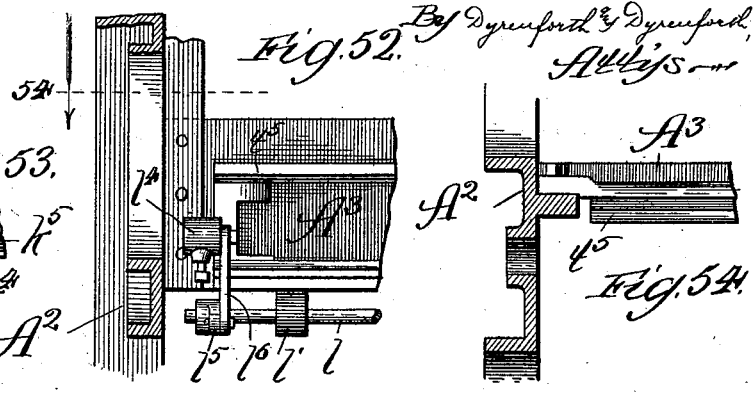
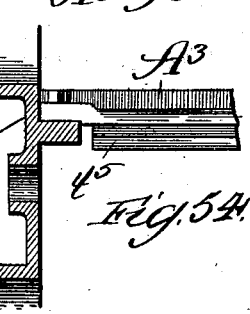
Witnesses:
Inventors:
Thurston L. Knudtson,
Jacob Uhri,
By Dyrenforth & Dyrenforth
Attys (No Model.) 17 Sheets—Sheet 14.
T. L. KNUDTSON & J. UHRI.
MACHINE FOR MAKING BOX BLANKS.
No. 518,038. Patented Apr. 10, 1894.
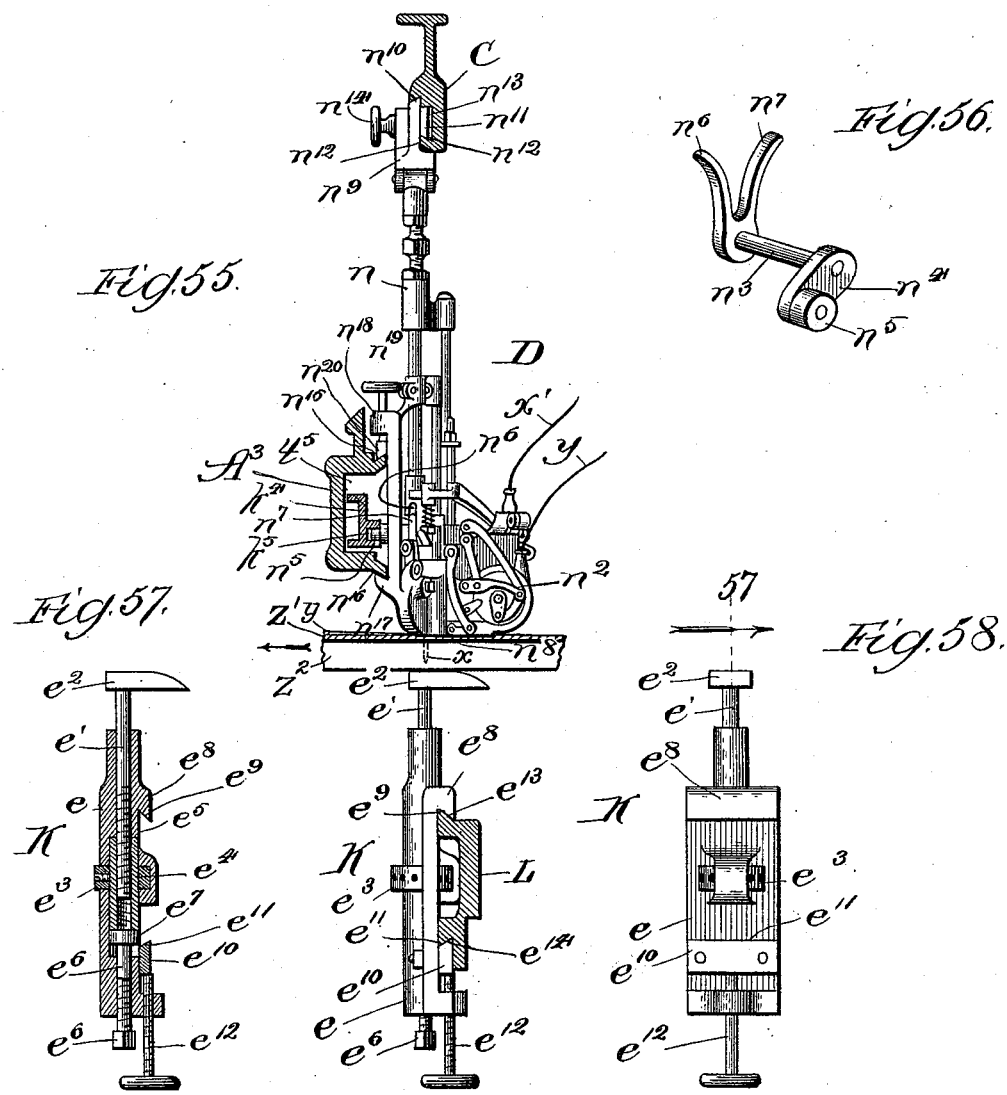

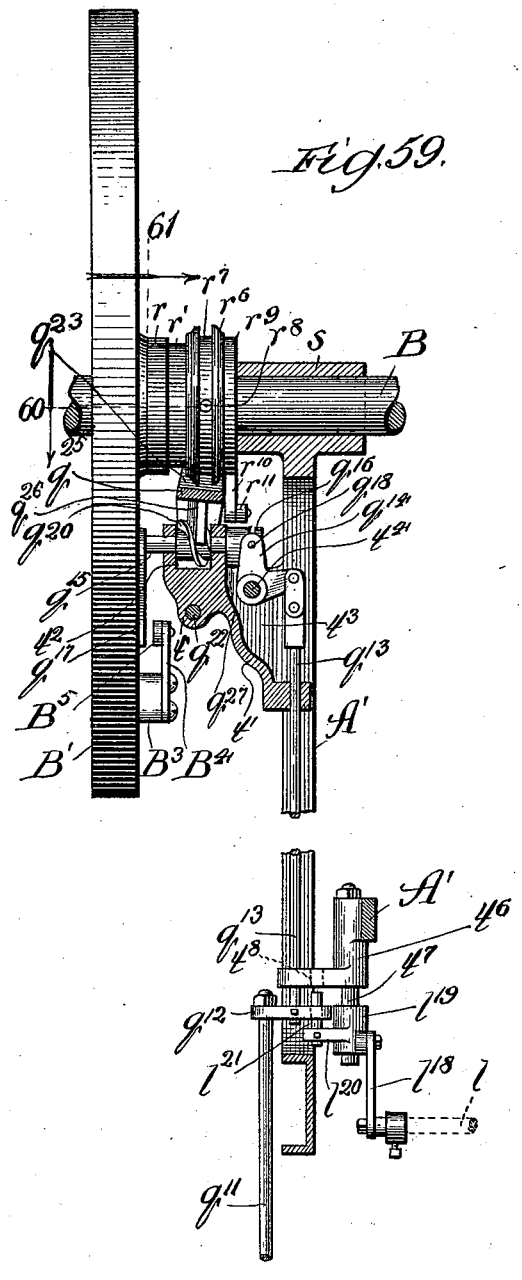

(No Model.) 17 Sheets—Sheet 16.
T. L. KNUDTSON & J. UHRI.
MACHINE FOR MAKING BOX BLANKS.
No. 518,038. Patented Apr. 10, 1894.
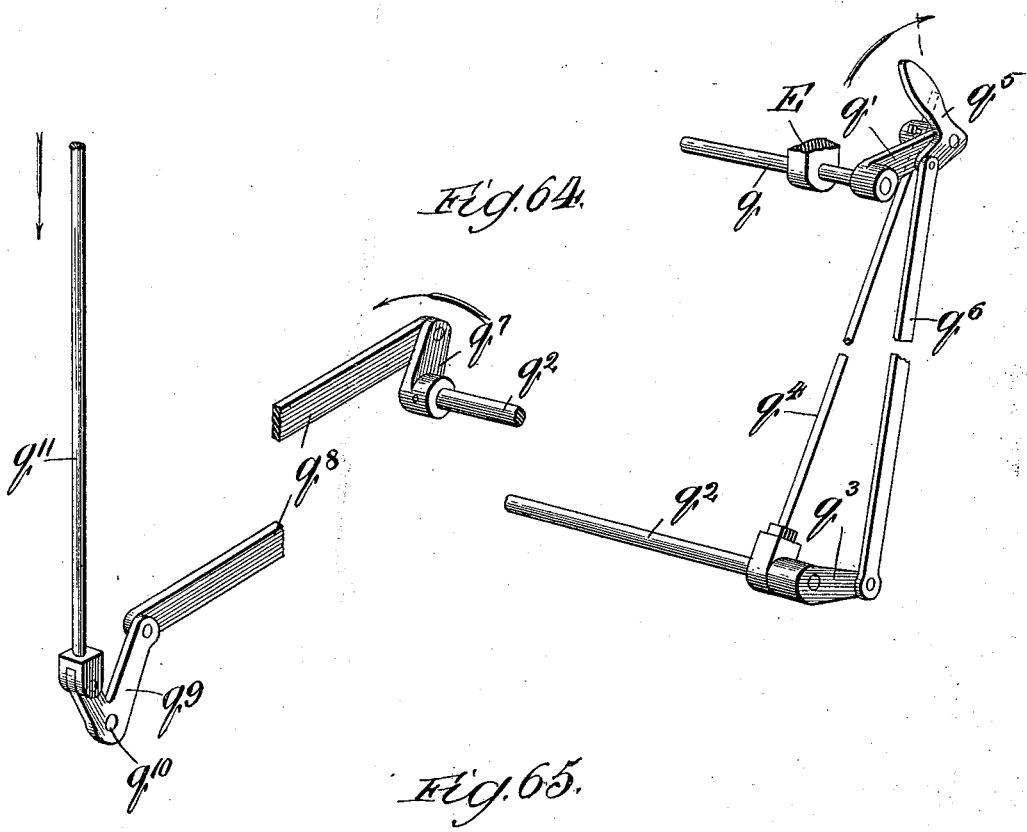
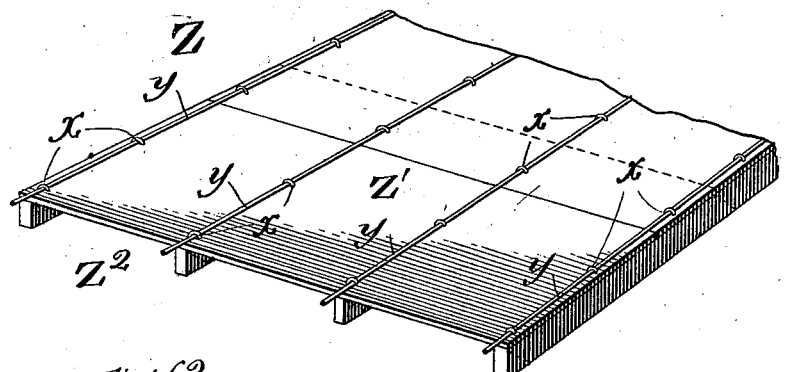
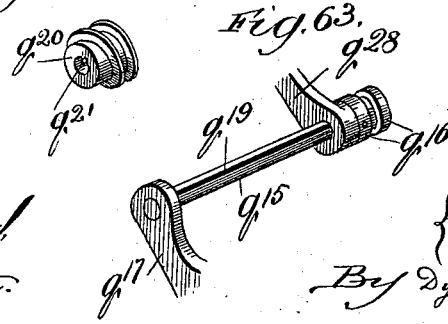

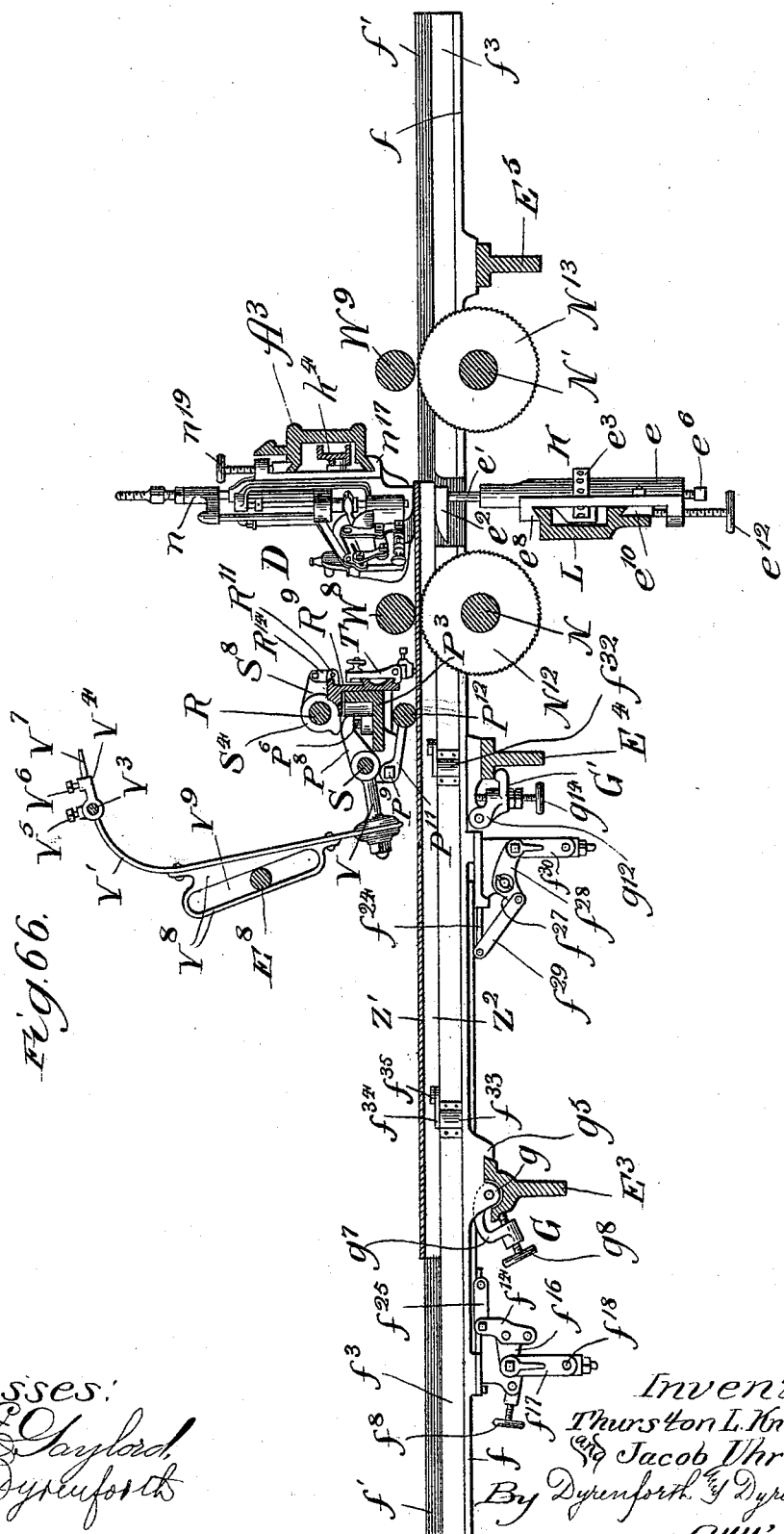

UNITED STATES PATENT OFFICE.

THURSTON L. KNUDTSON AND JACOB UHRI, OF CHICAGO, ILLINOIS.

MACHINE FOR MAKING BOX-BLANKS.

SPECIFICATION forming part of Letters Patent No. 518,038, dated April 10, 1894.

Application filed February 10, 1893. Serial No. 461,785. (No model.)

*To all whom it may concern:*

Be it known that we, THURSTON L. KNUDTSON and JACOB UHRI, citizens of the United States, residing at Chicago, in the county of Cook and State of Illinois, have invented a new and useful Improvement in Machines for Making Box-Blanks, of which the following is a specification.

Our object, broadly stated, is to provide a machine of improved construction, for driving staples into material fed by the machine intermittingly across the staple drivers.

Our object is more especially to provide a machine for making a certain box blank. The box blank consists of thin sheets of lumber provided on one side with cleats, and on its opposite side, coincident with the cleats, with strips of wire held in place by staples which pass through the sheets of lumber and into the cleats to hold the wires, sheets and cleats together. In Figure 65 of the drawings, a broken perspective view is given of the blank to be manufactured. The thin sheet of lumber is formed of veneering or backing in strips of the same or different widths extending side by side. The cleats, usually, though not necessarily four in number, extend transversely of the strips which afford the sheet, and the strengthening wires extend transversely of the said strips and coincidently with the cleats as shown. The ends of the wires extend beyond the opposite ends of the blank as shown.

Our present invention has only to do with the manufacture of blanks of the general form shown in the figure referred to, but it may be stated that to form the blanks into boxes the cleats are cut, as indicated by dotted lines, to make four separate lengths and the blank is bent over at the points where the cleats are cut to afford the four sides of the box, the opposite ends of the blank being secured by twisting together the projecting ends of the wires. The cleats at the opposite ends of the blank, when the latter is bent into the form of a box as described, are at the opposite ends respectively of the box, and box ends may be nailed or otherwise secured upon the said end cleats to complete the box.

In the machine forming the subject of the present application, the cleats are placed in guides extending longitudinally of the machine, strips of backing, veneering or the like are placed upon and transversely of the cleats and the machine is then set in motion to carry the cleats, and a sheet formed by the strips of backing or veneering, beneath devices which feed strengthening wires to the sheet and staple the same to the sheet and cleats, as before stated, to produce the blank.

Figure 38:
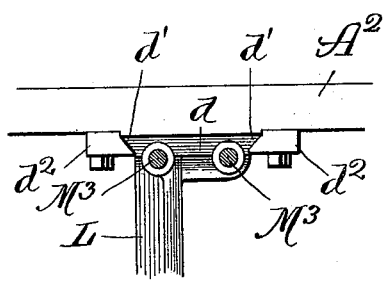
Figure 39:
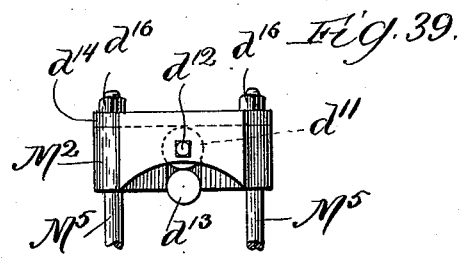
Figure 41:
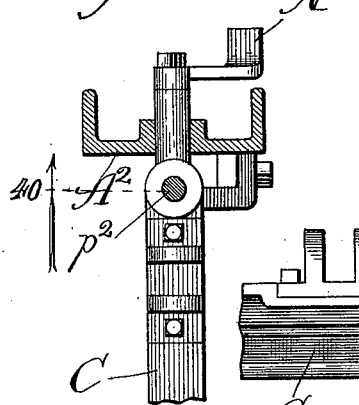
Figures 40, 42:
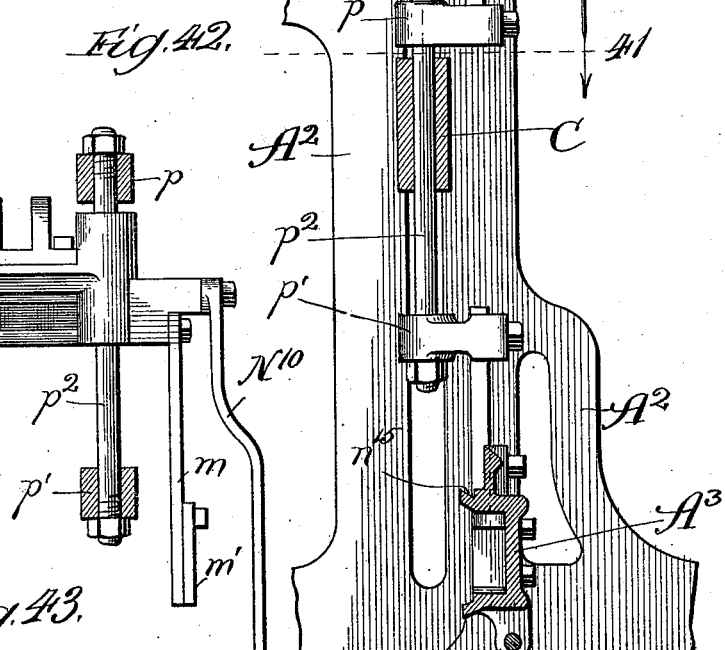
Figure 43:
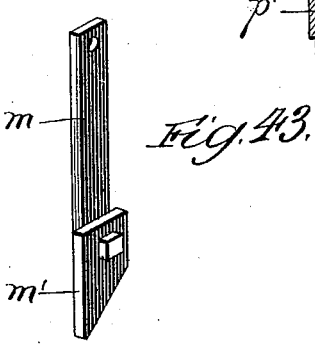

In the drawings—Fig. 1 is an elevation partly broken of one side of the machine; Fig. 2, a view in elevation of the opposite side of the machine; Fig. 3, a sectional plan view with a part broken away, the section being taken on line 3 of Fig. 1; Fig. 4, a vertical cross section taken on line 4 of Fig. 1; Fig. 5, an enlarged section taken on line 5 of Fig. 3 in the direction of the arrow and illustrating mechanism for raising and lowering the bed of the machine; Fig. 6, a cross section of a detail of the raising and lowering mechanism taken on line 6 of Figs. 5 and 8; Fig. 7, a broken sectional plan view of one corner portion of the bed frame, the section being taken on line 7 of Fig. 5; Fig. 8, a broken sectional elevation taken on line 8 of Fig. 7; Fig. 9, a section taken on line 9 of Fig. 5 across the machine, in the direction of the arrow, and showing the connecting shaft between the raising and lowering mechanisms at opposite sides of the bed frame; Figs. 10 and 11 perspective detail views of cam faced bearings forming part of the said raising and lowering mechanism; Fig. 12, an enlarged broken, and partly sectional, view of details forming part of the feed mechanism for the material to be worked upon, the section being taken on line 12 of Fig. 5; Fig. 13, a broken sectional plan view taken on line 13 of Fig. 12 in the direction of the arrow; Fig. 14, a section taken on line 14 of Fig. 3, viewed in the direction of the arrow, and showing one of the end cleat guides with its attachments in elevation; Figs. 15 and 15$^a$ broken sectional plan views of end portions of the guide bar shown in Fig. 14, the section being taken on line 15 of Fig. 16; Fig. 16, an enlarged section taken on line 16 of Fig. 14, and viewed in the direction of the arrow; Fig. 17, an enlarged view broken away at the ends showing the opposite side of the guide bar illustrated in Fig. 14; Fig. 18, a perspective detail view of one of the spring clamps for a cleat, mounted on the guide bar described; Fig. 19, a broken cross section of the machine, the section being taken on line 19 of Fig. 3, and viewed in the direction of the arrow; Fig. 20, a broken section taken on line 20 of Fig. 19, viewed in the direction of the arrow, and enlarged; Fig. 21, an enlarged section of a detail, the section being taken on line 21 of Fig. 19 and viewed in the direction of the arrow; Fig. 22, a section taken on line 22 of Fig. 19, and illustrating a slide bar detail; Fig. 23, a top plan view of the slide bar shown in Fig. 22; Fig. 24, an enlarged section taken on line 24 of Fig. 3, showing details of construction; Figs. 25 and 26 enlarged sections taken, respectively, on lines 25 and 26 of Fig. 19 showing certain details in elevation; Fig. 27, a section taken on line 27 of Fig. 25, and viewed in the direction of the arrow; Fig. 28, a perspective view of a crank; Figs. 29 and 30 perspective views of details of the feed mechanism for the material to be worked upon; Fig. 31, an enlarged broken plan view of supporting racks for spools carrying wires; Fig. 32, a section taken on line 32 of Fig. 31, and viewed in the direction of the arrow; Fig. 33, a partly broken side elevation of one of the spool supports; Figs. 34 and 35 enlarged broken sectional views taken respectively on lines 34 and 35 of Fig. 4; Fig. 36, a section on line 36 of Fig. 37 viewed in the direction of the arrow; Fig. 37, a broken section taken on line 37 of Fig. 34; Fig. 38, a broken plan sectional view taken on line 38 of Fig. 34; Fig. 39, a broken side elevation of certain features of the construction of the parts shown in Figs. 35, 36 and 37, detached; Fig. 40, a broken sectional elevation showing in detail certain features illustrated in Fig. 34, the section being taken on line 40 of Fig. 41; Figs. 41 and 42 broken sectional plan views taken on lines 41 and 42, respectively, of Fig. 40; Fig. 43, a perspective view of a switch cam shown in Fig. 2; Fig. 44, a view in side elevation of a bracket detail; Fig. 45, a front elevation of the same; Fig. 46, a detail view of cranks and a link connection therefor; Fig. 47, a broken view in side elevation of the switch cam illustrated in Fig. 43, showing it in proper relation to switch mechanism illustrated partly in section and partly in elevation in Fig. 48, the section being on line 48 of Fig. 44, viewed in the direction of the arrow; Fig. 49, a sectional view of parts of the switch mechanism connected with and actuated by the mechanism shown in Fig. 48; Fig. 50, a sectional plan view taken on line 50 of Fig. 45, and showing an operating handle; Fig. 51, a detail view in front elevation of the handle illustrated in Fig. 50; Fig. 52, a broken section taken on line 52 of Fig. 34; Fig. 53, a broken view in front elevation of the mechanism shown by sectional view in Fig. 49; Fig. 54, a broken sectional plan view taken on line 54 of Fig. 52 corresponding with line 54 of Fig. 34; Fig. 55, a staple making and driving and strengthening wire feeding machine, and a clincher showing the manner of supporting them in position, the view being a section taken on line 55 of Fig. 4, enlarged, and viewed in the direction of the arrow; Fig. 56, an enlarged perspective view of a detail forming part of the mechanism illustrated in Fig. 55; Fig. 57, a vertical central section of the clincher, the section being taken on line 57 of Fig. 58; Fig. 58, a front elevation of the clincher shown in Fig. 55; Fig. 59, an enlarged sectional elevation of clutch mechanism for starting and stopping the machine, the section being taken on line 59 of Fig. 61, corresponding with line 59 of Fig. 1; Figs. 60 and 61 sections taken, respectively, on lines 60 and 61 of Fig. 59 and viewed as indicated by the arrows; Fig. 62, an enlarged perspective view of a worm sleeve forming part of the operating mechanism for the clutch shown in Figs. 59, 60 and 61; Fig. 63, a broken perspective detail view of other features of the said clutch operating mechanism; Fig. 64, broken perspective views of details of mechanism for operating the clutch to start and stop the machine; Fig. 65, a broken perspective view of one of the box blanks which the machine is designed to manufacture; and Fig. 66, a longitudinal section taken on line 66 of Fig. 3 and viewed in the direction of the arrow.

A is the main frame of the machine formed with the side castings $A'$ $A^2$ secured together in rigid relation by a cross bar $t$ at the rear of the machine, a similar cross bar at the forward end portion thereof, other across extending bars, which will be hereinafter referred to, and a cross beam $A^3$. On the side $A'$ is a bracket $A^4$, shown most clearly in Fig. 4.

B is the drive shaft of the machine journaled in bearings $s$ $s'$ and $s^2$, at the tops, respectively, of the sides $A'$ $A^2$ and bracket $A^4$. Loose upon the drive shaft B is a driver in the form of an integral fly-wheel $B'$ and step pulley $B^2$. On the inner side of the fly-wheel is a lug $B^3$ carrying an arm $B^4$ which extends toward the shaft B in a plane parallel with the fly-wheel. At the outer side of the free end of the arm $B^4$ is a wheel $B^5$. The mechanism for producing and releasing engagement between the drive pulleys $B^2$ and the drive shaft B is shown in detail in Figs. 59 to 64 inclusive. The inner face of the hub portion of the fly-wheel is provided with two diametrically opposed threaded openings $B^6$ in which are screwed two short pins $B^7$. At the side of the hub of the fly-wheel is a sleeve $r$ fixed to the shaft and having a circumferential annular recess $r'$, and provided in its face adjacent to the fly-wheel with an annular groove $r^2$ into which the pins $B^7$ project. Extending through the sleeve $r$ parallel with and at opposite sides of the shaft B are diametrically opposed openings $r^3$ which intersect the groove $r^2$. Extending from the openings $r^3$ to the recess $r'$ are elongated openings or slots $r^4$. In the openings $r^3$ and adapted to slide therein are pins $r^5$. Around the recess $r'$ is a loose collar $r^6$ having a circumferential groove $r^7$. Extending through radial openings in the collar $r^6$ and through the slots $r^4$ are pins $r^8$ which engage openings in the pins $r^5$ to form virtually integral parts of the latter. Movement of the collar $r^6$ in the direction of the hub of the fly-wheel causes it to move the pins $r^8$ in the slots $r^4$, and through the said pins to move the pins $r^5$ longitudinally in the direction of the hub of the fly-wheel, and into the path of the pins $B^7$, whereby the shaft will be revolved with the fly-wheel and drive pulleys.

Movement of the clutch described to bring about the engagement of the shaft B and the drive pulleys is effected by means of the following shipping mechanism: (See Figs. 1, 2, 59 and 64.) Journaled in a raising and lowering bed frame to be hereinafter described and extending transversely across the machine near the forward end of the latter is a rod $q$ which projects beyond the side $A^2$. On the end portion of the said shaft is a link $q'$. Directly below and extending parallel with the rod $q$ is a shaft $q^2$ provided adjacent to the side $A^2$ with a crank $q^3$. Pivoted upon the end of the shaft $q^2$ and at its opposite end to the free end of the link $q'$ is a stay rod $q^4$. On the end of the link $q'$ is a handle $q^5$ in the form of a bell crank pivoted between its ends to the link $q'$. A link $q^6$ is pivotally connected at its opposite ends to the short arm of the handle $q^5$ and the free end of the crank $q^3$. At the side $A'$ of the machine the shaft $q^2$ carries a crank $q^7$ pivotally connected at its free end with a reciprocal backward extending bar $q^8$. A bell crank lever $q^9$ is pivoted at $q^{10}$ to the lower end of the bracket $A^4$ at the inner face of the latter, and at the end of one of its arms is pivotally connected with the bar $q^8$. Between the bracket $A^4$ and side $A'$ of the machine is a vertical recess (see Fig. 4) formed by a concavity of the bracket, in which is a vertically reciprocal rod $q^{11}$ pivotally connected at its lower end with the bell crank $q^9$, as shown most clearly in Fig. 64. At the top of the rod $q^{11}$ (as most clearly shown in Fig. 59), and fixed to the said rod is a horizontal plate $q^{12}$ from the center of which rises a vertical rod $q^{13}$, movable in a guide opening in the end of a bracket $t^6$ on the side $A'$ of the machine. On the side $A'$ and extending in an upward direction between the same and the fly-wheel $B'$ is a bracket $t'$ provided in its upper end with a recess $t^2$ and at its side adjacent to the frame $A'$ with a recess $t^3$. Journaled in the bracket and extending across the recess $t^3$ is a short shaft $t^4$; and on the said shaft in the recess $t^3$ is a bell crank lever $q^{14}$ pivotally connected at the free end of one of its arms with the upper end of the rod $q^{13}$. Parallel with the shaft B and extending across the recess $t^2$ through openings in the bracket $t'$ is a longitudinally movable shaft $q^{15}$, carrying at its rear end a grooved collar $q^{16}$, and at its forward end an arm $q^{17}$. At the upper end of the bell crank lever $q^{14}$ is a pin $q^{18}$ which extends loosely into the groove of the collar $q^{16}$. The shaft $q^{15}$ is provided with a longitudinal groove or keyway $q^{19}$ (see Fig. 63), and on the said shaft in the recess $t^2$ of the bracket is a worm sleeve $q^{20}$ provided with a feather $q^{21}$, which extends into the key-way $q^{19}$. The worm $q^{20}$ will thus be caused to turn with the shaft $q^{15}$ while permitting the latter to be moved longitudinally through it, as hereinafter described. Pivoted at its lower end to a bearing shaft $q^{22}$ on the bracket $t'$ is a stirrup frame $q^{23}$ which at its free end embraces the collar $r^6$ and is provided with inward projecting pins $q^{24}$, which extend into the annular groove $r^7$ of the said collar. The stirrup frame is provided with a cross bar $q^{25}$ carrying a downward extending lug $q^{26}$, which engages the worm of the worm sleeve $q^{20}$, as shown most clearly in Fig. 59. On the shaft B between the sleeve $r$ and the bearing $s$ is a collar $r^9$ carrying a radially extending arm $r^{10}$; and on the shaft $q^{15}$ between the brackets $t'$ and the collar $q^{16}$ is a collar $q^{27}$ having a radially extending arm $q^{28}$. On the arm $r^{10}$ is a wheel $r^{11}$. To bring about engagement of the clutch mechanism, to cause the shaft B to be revolved by the drive pulleys, the handle $q^5$ is turned in the direction of the arrow (Fig. 64), raising the link $q^6$ and crank $q^3$ to turn the shaft $q^2$ and crank $q^7$ in the direction of the arrow. The bar $q^8$ is thus thrust backward turning the bell crank $q^9$ and drawing down the rod $q^{11}$, plate $q^{12}$ and rod $q^{13}$ to turn the bell crank lever $q^{14}$ in the direction which causes it to move the shaft $q^{15}$ toward the side $A'$. This movement of the shaft $q^{15}$ carries the free end of the arm $q^{17}$ into the path of the wheel $B^5$ on the end of the arm $B^4$ which rotates with the fly-wheel. The arm $q^{17}$ is formed with a cam edge, as shown in Fig. 61, against which the wheel $B^5$ strikes, operating to turn the arm $q^{17}$ in the direction of the arrow to a position at the opposite end of the dotted arc in Fig. 61. When the arm arrives at that position it extends beyond the path of the engaging wheel $B^5$. The turning of the shaft $q^{15}$ by the arm $q^{17}$ turns the worm sleeve $q^{20}$ in the direction which swings the upper end of the stirrup frame $q^{23}$ on its pivot $q^{22}$ in the direction of the fly-wheel carrying the collar $r^6$ in the same direction, and thus forcing the pins $r^5$ into the path of the pins $B^7$, as before described.

To stop the machine the handle $q^5$ is turned in the opposite direction to that described, causing the shaft $q^{15}$ to be forced in the direction of the fly-wheel, and carry the arm $q^{28}$ into the path of the wheel $r^{11}$ on the arm $r^{10}$, whereby the shaft $q^{15}$ and worm $q^{20}$ are turned in the contrary direction to that described, and swing the upper end of the stirrup frame in the direction away from the fly-wheel to move the collar $r^{11}$ and pins $r^5$ in the same direction, whereby the pins $r^5$ are withdrawn from the path of the pins $B^7$. The clutch mechanism as described is employed in order that the machinery may always stop when its parts are in certain relative positions, as hereinafter described.

On the side frames $A^2$ $A'$ are corresponding upper and lower brackets $p$ $p'$, respectively, affording supports for the upper and lower ends of guide rods $p^2$. (See Fig. 40.) The guide rods $p^2$ pass through the opposite ends of a vertically reciprocating cross-head C and afford guides for the same. On the shaft B toward opposite sides of the machine are eccentrics $C'$, (see Fig. 34,) comprising disks $o$ fixed upon the shaft some distance from their geometric centers. Around the disks $o$ are rings $o'$ carrying rods $o^2$ pivotally connected at their lower ends with ears $o^3$ at the opposite ends of the cross-head C. Interposed in the rods $o^2$ are the expansion screws $o^4$, shown, whereby the rods may be lengthened and shortened at will. The rotation of the disks $o$ within the ring $o'$ gives to the rods $o^2$ and cross-head C a reciprocal motion in the vertical plane.

Adjustably secured upon the beam $A^3$ are four machines, D, for forming and driving staples $x$, and for feeding strengthening wires $y$, for purposes hereinafter explained. Any machines which may be employed as attachments for the machine, forming the subject of this application, and which will drive staples and feed a strengthening wire as required may be employed in this connection, but the machines shown, and which we prefer to use, are of a construction invented by us, and which forms the subject of Letters Patent of the United States No. 483,254, granted to us September 27, 1892. For a detailed description of the staple forming and driving machines D we refer to the said patent, and only a sufficient description thereof will be attempted in the present application to make clear their functions and operation in the present machine. Each machine D is operated by a reciprocating rod $n$ suitably and adjustably secured at its upper end, as indicated in Fig. 55, to the cross-head C. The staples are made from a wire $x'$, which is fed by intermittent grip mechanism $n'$ across the path of reciprocating wire cutting and staple forming mechanisms, which in the upstroke of the rod $n$ severs the length from the wire and bends it into the form of a staple. At the same time a strengthening wire $y$ is fed by means of intermittent grip mechanism $n^2$ across an opening through which the staples are discharged. In the downstroke of the operating rod $n$ the staple is engaged by a ram which forces the staple through the said discharge opening into the material to be worked upon hereinafter described in a manner to cause the staple to straddle the strengthening wire $y$. In each reciprocation of the operating rod $n$ the strengthening wire $y$ is fed forward, as stated, at a speed equal to the velocity at which the material to be operated upon is fed below the staple machine, which in practice may be from one to three inches, or more, as desired. Means are provided in each staple machine for severing the strengthening wires $y$ when material operated upon passes beyond the staplers, and this is done by means of a pivotal switch $n^3$ (Fig. 56) forming a part of each stapling machine, and having an operating crank $n^4$ provided with a roller $n^5$, and two cam fingers $n^6$ $n^7$. When the switch is rocked to carry the cam face of the finger $n^6$ into the path of a descending lever which moves with the rod $n$, cutting mechanism at $n^8$ is actuated to sever the strengthening wire, and when the switch is rocked to carry the cam finger $n^7$ into the path of the descending lever mentioned, the strengthening wire cutting mechanism remains at rest. At the top of the rod $n$ is a block or head $n^9$ having a beveled upper edge $n^{10}$ and a loose clamping plate $n^{11}$ with a beveled lower edge $n^{12}$. The beveled edges $n^{10}$ $n^{12}$ form a dovetail which fits into a horizontal dovetailed recess $n^{13}$ extending longitudinally in the cross-head C. The plate $n^{11}$ is at the end of a set screw $n^{14}$. The block or head $n^9$ may be slid along the cross-head C to adjust it in position, and is tightened in place by turning the screw $n^{14}$ to bind the plate $n^{11}$ to the cross-head. The beam $A^3$ is formed at its upper edge with an inclined face $n^{15}$, and at its lower side with an inclined face $n^{16}$, the said inclined faces forming a dovetail. On the frame of each staple forming and driving machine D is a lug $n^{17}$ adapted to fit over the face $n^{16}$, and a lug $n^{18}$ extending over the face $n^{15}$. In the lug $n^{18}$ is a vertical set screw $n^{19}$ provided at its lower end with a loose beveled block $n^{20}$, which fits upon the face $n^{15}$. The staple making and driving machines may be adjusted by sliding them along the beam $B^3$, and tightened in position by means of the set screw $n^{19}$.

At the side $A^2$ of the machine is a vertical guide opening $z$ through which the end of the cross-head C beyond its guide rod $P^2$ extends. At the openings $z$ the cross-head carries a downward extending bar $m$ carrying a cam plate $m'$, shown in detail in Fig. 43. Extending along the lower forward side of the beam $A^3$ is a rock shaft $l$ in bearings $l'$ on the said beam. Upon the side $A^2$ of the machine is a stationary bracket $z'$. The bracket $z'$ extends through the slot or opening $z$, and is fastened rigidly against the under side of a bracket $z^2$ which is fastened against the inner side of the frame $A^2$, (see Fig. 34.) Extending through the bracket $z'$ in the direction transversely of the machine, and having its bearings in the said bracket, is a short rock shaft $l^2$ provided at the outer end of the bracket with an upward extending arm $l^3$, (see Figs. 45 and 48,) and at the inner side of the frame $A^2$ with a crank $l^4$. In the plane of the crank $l^4$ on the end of the shaft $l$ is a crank $l^5$, (see Fig. 46,) connected at its free end with the end of the crank $l^4$ by means of a link $l^6$. The outer end of the rock shaft $l^2$ is formed with a guide socket $l^7$, Fig. 48, and in the upper end portion of the arm $l^3$ is a guide opening $l^8$. Parallel with the arm $l^3$ is a sliding arm $l^9$, upon a stud $l^{10}$ movable in the socket $l^7$, and a bearing pin $l^{11}$ sliding through the opening $l^8$. On the end of the pin $l^{11}$ at the inner side of the arm $l^3$ is a wheel $l^{12}$. Pivoted between its ends on a pin $z^3$ passing through the end of an arm of the bracket $z'$ is a handle $l^{13}$ having the angular bifurcated portion $l^{14}$ on one side of its pivot. (See Figs. 50 and 51.) On the side of the sliding arm $l^9$ opposite its pin $l^{10}$ is a circular lug $l^{15}$ having a circumferential recess $l^{16}$. The forks of the handle $l^{13}$ straddle the lug $l^{15}$ and are provided with screws $l^{17}$, which extend into the annular groove $l^{16}$. Movement of the handle $l^{13}$ at the right-hand side (Fig. 2) of its pivot in the direction away from the side $A^2$ moves the bifurcated part $l^{14}$ toward the said side, and causes the sliding arm $l^9$ to be slid inward with its pins $l^{10}$ and $l^{11}$ in the guides $l^7 l^8$, to carry the wheel $l^{12}$ into the path of the reciprocating cam $m'$. In the subsequent downward movement of the cross-head C the cam $m'$ strikes the wheel $l^{12}$ and turns it, the arms $l^3 l^9$, the rock shaft $l^2$ and crank $l^4$ in the same direction to a limited extent, and causes the crank $l^5$ and shaft $l$ to be rocked to the left. At opposite end portions of the shaft $l$ are cranks $k$ (see Fig. 49) carrying downward extending pivotal links $k'$, which at their lower ends connect pivotally with collars $k^2$ fixed to the lower ends of vertical stems $k^3$ movable in guide openings in the beam $A^3$. In the forward face of the beam $A^3$ is a longitudinal recess $t^5$ across which the stems $k^3$ extend. In the said recess is a switch bar $k^4$ fixed at its opposite ends to the stems $k^3$. In the forward side of the bar $k^4$ is a groove $k^5$ just large enough to receive the wheels $n^5$ on the ends of the cranks $n^4$ of the oscillating switches, before described. When the handle $l^{13}$ is turned as described to rock the shaft $l$, as stated, the stems $k^3$ are raised and raise the switch bar $k^4$. In the rise of the bar $k^4$ the cranks $n^4$ are swung upward and rock the shafts $n^3$ in the direction to carry the switch fingers $n^6$ into the paths of the descending levers carried by the operating rods $n$ of the staple forming and driving devices, causing the severing mechanisms therein to sever the strengthening wires $y$, as before described. At the end of the shaft $l$ adjacent to the side $A'$ of the machine (see Fig. 59) is a crank $l^{18}$. Extending vertically downward from the bracket $t^6$ is a guide rod $t^7$ for a sliding collar $l^{19}$ with which the crank $l^{18}$ is pivotally connected at its upper end. On the collar $l^{19}$ is a lug $l^{20}$ carrying a vertical guide pin $l^{21}$ which moves freely through an opening in the plate $q^{12}$. In line with the pin $l^{21}$ is a guide opening $t^8$ through the bracket $t^6$ (indicated by dotted lines in Fig. 59), into which the pin $l^{21}$ may move in its rise. When the shaft $l$ is rocked, as before described, to cause the strengthening wire severing mechanisms to operate as stated, it is necessary that the machine shall be stopped temporarily, so that material for a new box blank may be placed in position to be fed forward, as hereinafter described. When the shaft $l$ is rocked, therefore, it swings the crank $l^{18}$ upward, causing the collars $l^{20}$ to be slid upward on the guide rod $t^7$, and causes its lug $l^{20}$ to engage the under side of the plate $q^{12}$ and raise the latter and the rod $q^{13}$ to stop the machine, as before described. The pin $l^{21}$ operates merely as a guide, and the openings $t^8$ is provided to permit the pin to rise with the collar without obstruction from the bracket $t^6$.

As before stated the box blanks Z (Fig. 65) to be manufactured in the machine comprise sheets Z' of veneering or backing, and cleats $Z^2$ which are of a greater width usually than their thickness and of a length equal to that of the blank to be formed. They are secured to the sheets at one edge, as shown.

Mounted in the main frame of the machine is a bed frame E formed with side bars $E' E^2$, and cross bars $E^3 E^4 E^5$. Between the cross bars $E^3 E^4$ the side bars $E' E^2$ are each provided with a downward projecting part $i$ having a horizontal flange with a flat under surface. Bolted against the said flat under surface (see Fig. 8) is a plate $i'$ carrying a vertical downward extending guide pin $i^2$. At the rear ends of the bars $E' E^2$ are downward extending parts $i^3$ fitting horizontal flanges like the parts $i$ and having flat under faces to which plates $i^4$ provided with downward extending guide pins $i^5$ are firmly bolted. Extending across the machine from the side $A'$ to the side $A^2$ between the cross-bars $E^3 E^4$ is an angle iron beam $A^5$. At its opposite ends the beam $A^5$ is formed with tables $t^9$ flanked by webs $t^{10} t^{11}$. The beam is secured to the sides $A' A^2$ by bolts $t^{12}$ which pass through the webs $t^{11}$. The guide pins $i^2$ extend downward through the upper and lower flanges of the angle iron beam $A^5$, as shown, and the tables $t^9$ afford flat horizontal surfaces. Extending between the side frames $A' A^2$ at the rear end of the machine is an angle iron cross beam $A^6$ of the same form in cross section as the beam $A^5$, but facing in the opposite direction. At its opposite ends the beam $A^6$ is formed with tables $t^{13}$ flanked by webs $t^{14} t^{15}$; the beam being secured in place by bolts $t^{16}$ passing through the sides $A' A^2$ and webs $t^{15}$. Secured against the under surfaces of the plates $i'$ by bolts $i^6$, which also serve to secure the plates $i'$ to the parts $i$, are blocks $i^7$ having extensions $i^8$ through which the pins $i^2$ pass, as shown, and provided also with cam faces $i^9$. Secured to the under surfaces of the plates $i^4$ by bolts $i^{10}$, which also serve to secure the said plates to the under surfaces of the parts $i^3$, are blocks $i^{11}$ having extensions $i^{12}$ through which the pins $i^5$ pass, as shown, and cam surfaces $i^{13}$. The constructions designated by the reference-letters $i$ to $i^{13}$ inclusive are exactly similar on opposite sides of the machine. It will be noticed that the cam surfaces $i^9 i^{13}$ incline in the same direction. Journaled at opposite ends in bearings afforded by the webs $t^{10}$ below the tables $t^9$ is a shaft $h$ to which is rigidly secured a bell crank lever $h'$ near the side $A^2$, (see Figs. 5 and 9.) Extending along the side frames $A'$ $A^2$ are longitudinally movable rods $h^2$, provided at opposite ends, respectively, with cam heads $h^3$ $h^4$. The cam heads $h^3$ extend between the cam faces $i^9$ of the blocks $i^7$ and the tables $t^9$, and the cam heads $h^4$ extend between the cam faces $i^{13}$ of the blocks $i^{11}$ and the tables $t^{13}$. On the rod $h^2$ is a laterally extending pin $h^5$ upon a plate $h^6$ (see Fig. 6) which is clamped to the rod $h^2$ by a clamping plate $h^7$ in a manner to grip the rods $h^2$ firmly between the plates. Along the rod $h^2$ on opposite sides of the plate $h^6$ the plate $h^7$ carries collars $h^8$ which afford additional gripping surfaces about the rod $h^2$. A link $h^9$ is pivotally connected at opposite ends, respectively, to the free end of the upper arm of the bell crank lever $h'$, and the pin $h^5$. On the shaft $h$ adjacent to the side $A'$ is a crank $h^{10}$ (see Fig. 9) corresponding in position with the upper arm of the bell crank lever $h'$. At its upper end the crank $h^{10}$ is pivotally connected to a link $h^9$ corresponding with the link $h^9$ described at the other side of the machine, and at its rear end the present link $h^9$ is pivotally connected to a longitudinally movable rod $h^2$ at the side $A'$ of the machine in the same way as at the other side, by engagement with a pin $h^5$ clamped rigidly to the rod, in the same way as shown in Fig. 6 and as described. Extending downward from the beam $A^5$ is an ear $t^{17}$ from which is pivotally suspended a bearing sleeve $t^{18}$ (Fig. 5) of smooth bore. Pivotally suspended from the lower arm of the bell crank lever $h'$ is an internally threaded sleeve $h^{11}$. Held in the sleeve $t^{19}$ against longitudinal movement thereon is a threaded shaft $h^{12}$, which passes through the sleeve $h^{11}$ and engages the threads therein. At the outer end of the sleeve $t^{18}$ the shaft $h^{12}$ is provided with a hand wheel $h^{13}$. The entire frame E rests at its four corners on the cam heads $h^3$ $h^4$, respectively, and the function of the mechanism described is to raise or lower the said bed frame equally at all sides. Turning of the hand wheel $h^{13}$ from right to left causes it to advance the sleeve $h^{11}$ along the shaft $h^{12}$ and swing the lower arm of the bell crank lever $h'$ in the direction to the right in Fig. 5, and the upper arm of the bell crank lever to the left. The swinging of the bell crank lever as described rocks the shaft $h$ to the left, and the links $h^9$ are moved longitudinally toward the front of the machine (to the left in Fig. 5), drawing with them the rods $h^2$. The cam heads $h^3$ $h^4$ are also moved with the rods $h^2$, and by the engagement of their cam faces with the cam faces $i^9$ $i^{13}$ of the blocks $i^7$ $i^{11}$, respectively, force the latter upward equally and raise the bed frame at its four corners. The pins $i^2$ $i^5$ move vertically upward in the guides as the bed frame rises and operate to steady the latter and prevent its movement in any but the vertical direction. Turning of the hand wheel $h^{13}$ in the direction opposite to that described moves the parts also in the opposite direction, and permits the bed frame to lower equally at its four corners of its own weight.

Extending longitudinally of the machine and resting upon the cross bars $E^3$ $E^4$ and $E^5$ are parallel cleat guides F F' $F^2$ and $F^3$. The cleat guides must register with the staple forming and driving devices D, and are adjustably secured in place upon the bars $E^3$ $E^4$ by clamps G G' provided upon each guide bar. The cross bar $E^3$ is of the form in cross section shown in Fig. 14, having a longitudinal concavity $g$ in its upper face, a beveled edge $g'$ at its rear upper side, a flange $g^2$ at its forward upper side, and a flat upper surface $g^3$. On the under surface of each cleat guide bar is a lug $g^4$ having a beveled projection $g^5$ adapted to fit against the beveled edge $g'$ of the bar $E^3$, a rounded portion or ear $g^6$ which projects into the concavity $g$ affording a bearing for a swinging bracket $g^7$ carrying a clamp screw $g^8$, and a flat surface $g^9$ fitting upon the flat surface $g^3$ of the cross bar. The swinging bracket $g^7$ curves over the flange $g^2$, and the clamp screw $g^8$ may be tightened against the under surface of the flange $g^2$ to draw the inclined face $g^5$ of the lug $g^4$ against the corresponding face $g'$ on the bar $E^3$, and thus clamp the cleat guide firmly in place. At the cross bar $E^4$ each cleat guide is provided with a lug $g^{10}$ having a flat under surface $g^{11}$, which rests upon the top of the said cross bar. The cross bar $E^4$ is T-shaped in cross section, as shown in Fig. 14. The lug $g^{10}$ affords a bearing for a pivotal clamp $g^{12}$, which between its ends has an opening $g^{13}$ (see Fig. 17) through which a clamp screw $g^{14}$ extends. The clamp screw $g^{14}$ at its upper threaded end extends into a threaded socket $g^{15}$ in the under face of the lug $g^{10}$. On the clamp screw $g^{14}$ are jam nuts $g^{16}$ affording a shoulder which bears against the under surface of the swinging clamp $g^{12}$. Turning of the screw $g^{14}$ to the right causes the shoulder $g^{16}$ to swing the clamp $g^{12}$ upward to bear at its free end portion against the under surface of the T-head of the bar $E^4$. The clamping mechanisms G and G' thus operate to hold the guide bars for the cleats firmly in adjusted position. Each cleat guide is L-shaped in cross section, (as indicated in Fig. 16) having a horizontal flange $f$, and a vertical flange $f'$.

As shown in Fig. 3 the guide F has its vertical flange on the left hand side, and all the other guides have their vertical flanges on the right-hand side. So far as the guides F' $F^2$ are concerned it makes no difference on which side the vertical flanges may be, but it is necessary that the guide F shall have its vertical flange on the left hand side, and the guide $F^3$ on the right-hand side. The vertical flanges $f'$ of the outer guides F $F^3$ extend upward somewhat higher than those of the intervening guides, as indicated in Fig. 19, for a purpose hereinafter explained.

The object of the guides F F' $F^2$ and $F^3$ is to guide the cleats in straight lines parallel with each other and longitudinally of the machine in a manner to cause the staple driving machines to drive the staples midway between the sides of the cleats. The side flanges $f'$ afford abutments against which the cleats slide at their sides, and they must be so adjusted as to guide the cleats in a manner to cause the staple drivers, which are the first parts adjusted in proper position in the machine, to drive the staples in the centers of the cleats. As for different blanks Z it may be desired to employ cleats $Z^2$, differing in thickness, the lateral adjustment of the guides F F' $F^2$ $F^3$ is a necessary feature. To shift the guides therefore to the right or left as may be required, their clamping mechanisms G G' may be loosened, and tightened again when the guides have been slid to the positions desired. Different blanks Z will also employ cleats $Z^2$, which differ in width. By width it is meant the distance between the upper and lower edges of the cleats in Fig. 65. The staple driving mechanisms, while they are laterally adjustable in the cross beam $A^3$, are in a fixed horizontal plane, and the upper edges of the cleats must be so guided to the staple driving devices as to move the sheet Z' against the under surfaces of the latter. To accomplish this when narrow cleats are employed they must be raised above the horizontal flanges $f$ of the guides, so that the sheet will pass over the upper edges of the vertical flanges $f'$ of the guides F $F^2$. To accomplish this on each cleat guide is an angle iron bar H, L-shaped in cross section, (as shown in Figs. 16 and 19) and formed with the upper horizontal flanges $f^2$ and downward extending vertical flange $f^3$. The bars H fit over the cleat guides, as shown in the figures mentioned, and are provided near opposite ends with stems $f^4$ extending downward through openings in the flanges $f$ of the guides, and through downward extending guide sleeves $f^5$ $f^6$ on under sides of the said cleat guides. The sleeves $f^5$ $f^6$ are parts of brackets I I' secured to the under surfaces of the cleat guides, as shown in Figs. 14 and 17. On one side of each bracket I is a sleeve bearing $f^7$ through which extends an adjusting screw $f^8$. On the adjusting screw at opposite ends of the sleeves $f^7$ are collars $f^9$ (Fig. 17) which prevent longitudinal movement of the screw in the sleeve without interfering with its rotation. Extending through the bracket I is a rock shaft $f^{10}$ carrying at one end a crank $f^{11}$ provided at its lower free end with a pivotal internally threaded sleeve $f^{12}$ into which the adjusting screw $f^8$ extends. On the opposite end of the shaft $f^{10}$, and fixed thereto, is a lever $f^{13}$ (Fig. 14) having an upward extending arm $f^{14}$, a downward extending arm $f^{15}$, and a forward extending arm $f^{16}$. Pivoted to the end of the forward extending arm $f^{16}$ is a downward extending link $f^{17}$, which at its lower end is pivotally connected to a laterally extending pin $f^{18}$ on the vertical stem $f^4$. Extending between the brackets I I' is a longitudinally movable rod $I^2$. Between the upper surface of the rear portion of the bracket I and the adjacent under surface of the cleat guide is a space $f^{19}$, and between the upper surface of the forward portion of the bracket I' and the adjacent under surface of the cleat guide is a space $f^{20}$. The rod $I^2$ extends at its opposite ends, respectively, into the said spaces, as indicated most clearly in Fig. 17. On the under surface of the rod $I^2$ adjacent to the bracket I is a lug $f^{21}$ having a horizontal guide opening through it, which fits over a backward extending guide stem $f^{22}$ extending from the said bracket parallel with the rod $I^2$. On the under surface of the rod $I^2$ adjacent to the bracket I' is a lug $f^{23}$ corresponding with the lug $f^{21}$ and adapted to slide upon a forward extending guide rod $f^{24}$ on the bracket I'. Pivotally connected at one end to the lug $f^{21}$, and at its opposite end to the arm $f^{14}$ of the lever $f^{13}$, is a link $f^{25}$. Pivoted between its ends on the bracket I' is a bell crank lever $f^{26}$, having a forward and downward extending arm $f^{27}$, and a backward and downward extending arm $f^{28}$. A link $f^{29}$ is pivotally connected at one end with the arm $f^{27}$ of the lever $f^{26}$, and at its opposite end to the lug $f^{23}$ on the rod $I^2$. A link $f^{30}$ is pivotally connected at one end to the arm $f^{28}$ of the bell crank lever $f^{26}$, and at its opposite end to a pin $f^{31}$, which extends laterally from the stem $f^4$. Turning of the adjusting screw $f^8$ to the right draws the crank $f^{11}$ forward and rocks the shaft $f^{10}$ in the direction to plunge the arm $f^{16}$ upward to raise the stem $f^4$ and to plunge the arm $f^{14}$ and through the link $f^{25}$ the rod $I^2$ backward to move the link $f^{29}$ in the downward direction, and to swing the arm $f^{28}$ upward to move the stem $f^4$ upward by means of the link $f^{30}$. Thus the stems $f^4$ $f^4$ are moved simultaneously and equal distances to raise the bar H equally throughout. On the sides of the bars H are vertical bearings $f^{32}$ for pins $f^{33}$, (see Fig. 18) carrying horizontal arms $f^{34}$ provided at their ends with wheels $f^{35}$. Springs $f^{36}$ are housed in the bearings $f^{32}$, and connected at opposite ends respectively to the pins $f^{33}$ and the bearings. The action of the spring $f^{36}$ is to swing the arm $f^{34}$ in the horizontal direction over the upper surface of the bar H, to cause its wheel $f^{35}$ to bear normally against the vertical flange $f'$. The wheels $f^{35}$ operate as clamps to hold the cleats $Z^2$ against the flanges $f'$, as indicated in Fig. 19. The central guides F' $F^2$ extend to the staple driving machines only, while the outer guides F $F^3$ extend to the cross bar $A^6$, as shown in Fig. 3. At the staple driving machines the guides F $F^3$ are cut away, so as not to interfere with the movement of the clinchers to be next described.

Below each staple and driving machine D is a clincher K. Each clincher comprises a frame $e$ affording a sleeve in which is a vertical threaded rod $e'$ provided at its top with an anvil or clinching head $e^2$. In a horizontal recess across the vertical opening in the sleeve is an adjusting wheel $e^3$ fastened rigidly to an internally threaded sleeve $e^4$. At its upper end the sleeve $e^4$ bears loosely against an annular shoulder $e^5$ in the frame $e$, and the threads on the inner surface of the sleeves engage the threads of the rod $e'$. Turning of the wheel $e^3$ to the left turns the sleeves $e^4$ and raises the rod $e'$ and anvil $e^2$ for purposes of adjustment. Extending upward through the base of the frame $e$ is a set screw $e^6$ having a head $e^7$ at its upper end. When the wheel $e^3$ has been turned to adjust the rod and anvil the set screw $e^6$ is turned to press the head $e^7$ against the lower end of the sleeve $e^4$, and operate as a jam screw to hold the latter against turning. It also operates as a foundation for the sleeves $e^4$ to relieve the wheel $e^3$ from shock under the impacts of the staple driving mechanism against the anvil or clincher $e^2$. At the forward side of each clincher frame $e$ near the top is a lug $e^8$ having a beveled surface $e^9$ at its under side, and toward the lower part of its forward side the frame carries a sliding plate $e^{10}$ having a beveled upper surface $e^{11}$. The surfaces $e^9$ $e^{11}$ afford a dovetail, and the plate $e^{10}$ is raised by means of a set screw $e^{12}$ extending through the lower end of the frame. The clinchers K are mounted upon a vertically reciprocating horizontal beam L, having an upper inclined edge $e^{13}$ and a lower inclined edge $e^{14}$. The beveled edge $e^9$ of the frame $e$ is adapted to fit upon the surface $e^{13}$, and the edge $e^{11}$ of the plate $e^{10}$ against the surface $e^{14}$. The clinchers may be adjusted laterally into position and tightened in place by turning the screws $e^{12}$ to clamp the plates $e^{10}$ against the surface $e^{14}$.

At opposite ends of the beam L are webs $d$ beveled at their opposite edges $d'$ to form dovetails, as indicated in Fig. 38. Secured upon the side frames of the machine are guide plates $d^2$ $d^2$, which together afford a dovetailed guide recess in which the web portion of the beam slides. On the drive shaft B adjacent to the eccentric C' are eccentrics M, shown in section in Figs. 36 and 37. Each eccentric M is formed with a disk having a cam surface $d^3$, and a surface $d^4$ in an arc of which the shaft B is the center. Around the disk is a yoke or boxing M' formed with an upper block $d^5$ and a lower block $d^6$ secured together by bolts $d^7$. In the boxing is an annular bearing face $d^8$ for the disk surface $d^4$ to slide against, and at the top of the boxing is an opening $d^9$. Fitting upon the box M' is a block or cross-head $M^2$ having a central chamber $d^{10}$. The chamber $d^{10}$ in its upper part contains a roller $d^{11}$ journaled upon a shaft $d^{12}$, which extends transversely through the cross head, and in the lower part of the chamber $d^{10}$, and projecting through the opening $d^9$ of the boxing is a roller $d^{13}$. The chamber $d^{10}$ is closed at the top by a plate $d^{14}$. $M^3$ $M^3$ are vertical rods secured at their lower ends to the end portions of the beam L and webs $d$ thereon, extending thence upward to a supplemental cross head $M^4$ from which rods $M^5$ extend upward through openings $d^{15}$ in the boxing, and through the cross-heads $M^2$ and plate $d^{14}$, being provided above the said plate with nuts $d^{16}$ which rest upon the said plate. The roller $d^{13}$ in each eccentric M rests upon the disk and the roller $d^{11}$ is in contact with the roller $d^{13}$. In the rotation of the shaft B the cam surface $d^3$ of the disk engages the roller $d^{13}$ and raises it upon the surface $d^4$ of the disk, causing it to bear against the roller $d^{11}$ and raise the cross-head $M^2$. In its rise the cross-head $M^2$ draws the rods $M^5$, supplemental cross-head $M^4$ and rods $M^3$ upward and slides the beam L upward in the guides $d^2$. When the surface $d^4$ moves past the roller $d^{13}$ the said rollers drop to the reduced cam surface $d^3$, and the cross-head $M^2$, rods $M^5$, cross-head $M^4$, rods $M^3$ and beam L drop to their initial positions shown in Figs. 34 and 36. The rise of the beam L plunges the clinchers K upward, and the latter are plunged downward when the beam L is lowered. The eccentrics C' M are so arranged with relation to each other that the operating rods $n$ of the staple forming and driving machines will be plunged downward to drive staples at the same time that the clinchers K are plunged upward; and the rods $n$ will rise as the clinchers descend.

In a horizontal plane below the staple driving devices and at opposite sides of the latter are feed roller shafts N N', journaled at opposite ends in the side bars E' $E^2$ of the raising and lowering bed frame E. The shafts N N' extend beyond the side $A^2$ of the machine where they are provided with gear wheels $N^2$ $N^3$, respectively. On a shaft $N^4$ journaled on the side rail $E^2$ of the bed frame between the shafts N N' are an integral gear $N^5$ and ratchet wheel $N^6$. The teeth of the gear $N^5$ engage the teeth of the gears $N^2$ $N^3$. Loosely pivoted upon the shaft $N^4$ is a bell crank lever $N^7$ provided at the end of its arm $N^8$ with a pawl $N^9$ which engages the ratchet $N^6$. A rod $N^{10}$ is pivotally connected at its upper end to the reciprocating bar $m$, before described, and at its lower end to the arm $N^{11}$ of the bell crank lever $N^7$. In the rise of the cross-head or beam C and bar $m$ the rod $N^{10}$ is raised swinging the bell crank lever on its pivot and causing the pawl $N^9$ to turn the ratchet $N^6$ and gear wheel $N^5$ to the right. The engagement of the gear $N^5$ with the gears $N^2$ $N^3$ turns the latter and the shafts N N' to the left. On the shaft N are feed rollers $N^{12}$, and on the shaft N' are feed rollers $N^{13}$. The feed rollers $N^{12}$ $N^{13}$ are wheels having roughened circumferential faces. The side rails E' $E^2$ of the raising and lowering bed frame are provided in their upper surfaces with recesses $c$.

P is a sliding frame which is operated by hand as hereinafter explained, its function being to feed the sheets Z' and cleats Z² forward initially until they are engaged and advanced by the feed rollers of the machine. The frame P is formed with two side bars P' P², and a cross bar P³. The cross bar P³ is L-shaped in cross section (see, for example, Fig. 22) and is bolted at opposite ends to flanges $b$ of the side bars P' P². On the side bars E' E² of the raising and lowering bed frame are standards E⁶ E⁷, respectively, and journaled at opposite end portions in the tops of the said standards is a shaft E⁸. Beyond the standard E⁶ the shaft E⁸ carries a gear wheel E⁹. Journaled in the standard E⁶ is a short shaft E¹⁰, carrying a pinion E¹¹ engaging the gear wheel E⁹; and at the outer end of the shaft E¹⁰ is a hand wheel E¹². On the shaft E⁸ adjacent to the standard E⁶ is a sleeve E¹³ which is keyed or otherwise secured to the shaft. On the sleeve E¹³ is a lug E¹⁴ (see Fig. 22). Surrounding the sleeve E¹³ is a loose collar E¹⁵ having an arm E¹⁶. The collar E¹⁵ is cut away, as shown in Fig. 22, to form a recess E¹⁷ with stops E¹⁸ E¹⁹ at opposite ends. The lug E¹⁴ plays in the recess E¹⁷ of the collar E¹⁵ between the stops E¹⁸ and E¹⁹. At its free end the arm E¹⁶ is pivotally connected to one end of a link E²⁰, which at its opposite end is pivotally connected to an ear E²¹ on the side bar P². Adjacent to the standard E⁷ on the side bar P' of the sliding frame is a sleeve E²² which corresponds with the sleeve E¹³ at the other end of the shaft E⁸. The sleeve E²² is secured to the shaft by a set screw E²³, see Fig. 27. On the sleeve E²² is a radial arm E²⁴, which corresponds with the lug E¹⁴ on the sleeve E¹³. Surrounding the sleeve E²² is a loose collar E²⁵ having an arm E²⁶, and the collar is recessed in the same way as the collar E¹⁵ to afford the stops E²⁷ E²⁸, as shown in Fig. 29, the stops corresponding with the stops E¹⁸ and E¹⁹ on the collar E¹⁵. The arm E²⁴ on the sleeve E²² plays between the stops E²⁷ E²⁸. The arm E²⁶ is pivotally connected at its free end to a link E²⁹, which at its opposite ends is pivotally connected to an ear E³⁰ on the side bar P', see Fig. 1.

Extending longitudinally of the cross bar P³ is a shaft R mounted in bearings afforded by webs P⁸ at the ends of the bar P³ and bolted to the flanges $b$. On the end of the shaft R adjacent to the standard E⁷ is a crank R' provided with a pin R², as shown in Fig. 28. Surrounding the sleeve E²² at the standard E⁷ is a yoke R³ having an inner circumferential face which fits loosely over the outer circumferential surface of the sleeve. At the upper side of the yoke is a yoke or cross-head R⁴ on the ends of rods R⁵ which pass loosely through openings in opposite sides of the yoke R³ and extend to a yoke R⁶. Between the rods R⁵ the yoke R⁶ is pivoted to the pin R² of the crank R'. On the side of the yoke or cross head R⁴ is a projection R⁷ with a cam edge R⁸. The face of the projection R⁸ is just out of the path of the arm E²⁴ on the sleeve E²², and near the free end of the arm E²⁴ is a roller E³¹ which as the shaft E⁸ is turned glides across the cam edge R⁸ in the path of the dotted arc in Fig. 25, and by its engagement with the said cam edge forces the cross head R⁴ to the yoke R⁶ and moves the rods R⁵ to turn the crank R' and shaft R a limited distance. The cross bar P³ presents a smooth vertical rear surface against which fits a vertically sliding plate R⁹, (see Figs. 19 and 20) extending nearly the full length of the bar P³. On the rear face of the plate R⁹ are longitudinal ridges R¹⁰ R¹⁰, which together form a dovetailed projection. At opposite end portions of the rear face of the plate R⁹ are ears R¹¹, and at the forward upper edge of the plate R⁹ is a horizontal longitudinally extending flange R¹², which overlaps the upper edge of the bar P³. In opposite end portions of the bar P³ are vertical guide openings P⁴, (see Fig. 24) and coincident with the said openings are downward extending pins R¹³ on the flange R¹² of the plate R⁹. The pins R¹³ slide up and down in the openings P⁴ to guide the plate R⁹ and maintain it against the rear face of the bar P³. In the bar P³ directly forward of the openings P⁴ are vertical sockets P⁵ containing vertically movable headed studs P⁶. Confined between the heads of the studs P⁶ and the bases of the sockets P⁵ are springs P⁷, which tend to maintain the studs P⁶ at their upper limits. Journaled at opposite ends in the webs P⁸ is a shaft S, which extends parallel with the shaft R. On the shaft S adjacent to the webs P⁸ are backward extending fingers S' having at their free ends straight under surfaces S² which rest upon the heads of the pins P⁶ and cam shaped upper surfaces S³. Keyed to the shaft R at the fingers S' are collars S⁴ provided with cam projections S⁵ having the cam surfaces S⁶ S⁷ and a short arm S⁸. Links R¹⁴ are pivotally connected at their upper ends to the arms S⁸, and at their lower ends to the ears R¹¹ on the plate R⁹. The cam surfaces S⁶ of the projections S⁵ are normally in engagement with the cam surfaces S³ of the fingers S', as shown in Fig. 24, the fingers operating to hold the shaft R against being rocked except by power applied to the crank R', as hereinafter described.

Fastened adjustably on the rear face of the plate R⁹ are spear-holders T, shown in vertical section in Fig. 21. On the forward side of each holder T is a lug T' having a beveled upper face, and a clamping plate T² having a beveled under face. The said beveled faces form a dovetailed groove between them, to fit over and engage the dovetailed ridges R¹⁰ on the plate R⁹. The clamping plate T² is upon a threaded pin T³ and may be tightened and loosened by the turning of a thumb nut T⁴. When the clamping plate is loosened the holder T may be slid along the plate R⁹ to any desired position and may be fastened rigidly in place by tightening the clamping plate T² again. Hinged to the lower end of each holder T is a socket-piece T⁵ held normally against a stop T⁶ by a spring T⁷. The socket-piece extends normally downward in line with the holder T and is prevented from swinging forward from that position by the stop $T^6$. It may, however, swing in the backward direction against the resistance of the spring $T^7$. In the socket of the socket-piece $T^5$ is a downward projecting sharp pointed pin or spear $T^8$, fastened in place by a set screw $T^9$.

Pivoted upon the shaft S near opposite ends of the latter, as shown in Figs. 3 and 20, are arms V V provided at their upper ends with fingers V', which extend backward for a distance in a straight line as shown, and curve thence downward. Secured at opposite ends by set screws $V^2$ to the free ends of the fingers is a horizontal rod $V^3$, which extends parallel with the shaft S. On the rod $V^3$ are socket pieces or holders $V^4$ which are adjustable along the rod and are provided with set screws $V^5$ for securing them in adjusted position. Secured by set screws $V^6$ in the sockets of the holders $V^4$ are pins or stops $V^7$. On the top of each finger V' is a block $V^8$ having an elongated opening $V^9$ extending at an angle to the finger and receiving the shaft $E^8$, as shown in Fig. 20. The block $V^8$ affords a cam loop for the purpose hereinafter described.

Surrounding the sleeve $E^{22}$ and confined between a collar $E^{32}$ and the yoke $R^3$ is a yoke $E^{33}$ having guide openings $E^{34}$ on opposite sides for longitudinally reciprocating rods $E^{35}$. The rods $E^{35}$ at their opposite ends are secured in a yoke $E^{36}$ which loosely surrounds the shaft R. Above the yoke $E^{33}$ on the rods $E^{35}$ are adjusting nuts $E^{37}$ and jam nuts $E^{38}$, see Fig. 26. The yokes $E^{33}$ $E^{36}$ and rods $E^{35}$ prevent separation of the shafts $E^8$ R for a greater distance than that desired in the forward and backward movement of the sliding frame P as hereinafter described. By turning the nuts $E^{37}$ to decrease the distance to which the shafts $E^8$ R may separate the cross head $R^4$ is permitted to separate itself a greater distance from the yoke $R^3$, and thus increase the distance of plunge of the rods $R^5$ under the engagement of the wheel $E^{31}$ with the cam $R^8$, and thus further increase the distance to which the shaft R will be rocked to plunge the spears into the material Z' $Z^2$. Turning of the adjusting nuts $E^{37}$ to increase the distance which the shafts $E^8$ R may separate decreases the distance which the cross head $R^4$ may separate from the yoke $R^3$, and consequently the distance of movement of the rods $R^5$ under the engagement of the wheel $E^{31}$ with the cam $R^8$, causing the spears $T^8$ to be plunged a shorter distance into the material Z' $Z^2$ by the more limited rocking of the shaft R.

Secured by bolts $P^9$ passing through bolt-holes $P^{10}$ in the webs $P^8$ of the bar $P^3$ are backward and downward extending arms $P^{11}$ affording at their free ends bearings for the opposite ends of a guide roller $P^{12}$ below the bar $P^3$, see Fig. 20.

On the side bars E' $E^2$ of the raising and lowering bed frame are brackets W (see Fig. 12), provided at their upper ends with sleeves W' threaded internally at their upper end portions. Fitting into the tops of the sleeves W' are hollow adjusting screws $W^2$. Working in each sleeve W' is a plunger $W^3$ having a head portion $W^4$ at its lower end, and a stem $W^5$ which extends upward through the sleeve and the hollow screw $W^2$. In each sleeve W' confined between the plunger head $W^4$ and the adjusting screw $W^2$ is a spring $W^6$. On the stem $W^5$ above the screw $W^2$ are jamb nuts $W^7$. Four brackets W with their plungers $W^4$ are provided upon the machines, two at each side placed coincidently, as shown in Fig. 3. The plungers $W^4$ at their lower end portions afford bearings for two transverse guide rollers $W^8$ $W^9$, respectively, which extend above and parallel with the shafts N N', respectively, which have been before described.

The side bars P' $P^2$ of the sliding frame P are angular in cross section, as shown, for example, in Fig. 12, to afford longitudinal recesses b' which extend from the flanges b to the rear ends of the said side bars, see Fig. 23. The bases of the recesses b' of the side bars P' $P^2$, respectively, have coincident surfaces formed in steps $b^2$ $b^3$ $b^4$. The steps $b^2$ are the lowest, the steps $b^3$ slightly higher than the steps or surfaces $b^2$, and the steps or surfaces $b^4$ in a plane slightly higher than the steps or surfaces $b^3$. Between the surfaces $b^2$ and $b^3$ are abrupt cam surfaces $b^5$; and between the surfaces $b^3$ $b^4$ are abrupt cam surfaces $b^6$. The roller $W^8$ is provided at opposite ends with wheels or pulleys $W^{10}$, and the roller $W^9$ is provided at opposite ends with wheels or pulleys $W^{11}$. The wheels $W^{10}$ and $W^{11}$ of the rollers $W^8$ $W^9$ rest in the recesses b' of the side bars P' $P^2$, being held down to the bases of the latter by the springs $W^6$.

The operation is as follows: Assuming for example that the boxes for which the blanks Z are intended are to be three feet in length and two feet square in cross section, that is to say in width and depth outside measurement, the blanks must be eight feet long and three feet wide. In other words, the strips of backing forming the sheet Z' must be three feet in length and the cleats $Z^2$ eight feet in length. We will assume further that the cleats are each two inches in width, and the backing material Z' one-eighth of an inch in thickness. To adjust the machine for making blanks of the said dimensions and sizes of material, the staple drivers and formers D are slid along the beams C, $A^3$, and tightened in position, as before described, with their staple discharge openings about one foot apart. The cleat guide bars are then adjusted along the supporting cross bars $E^3$ $E^4$ $E^5$ and tightened in place by means of the clamps G G' to register with the staple driving machines, and extend with their upper projecting flanges f' slightly to one side of the plane of the staple discharge openings in the said machines. When adjusted, the side guides F F³ will be just far enough apart to permit the lengths of backing or veneering Z' to extend between the respective flanges $f'$, as indicated in Fig. 19. As shown in the said figure the flanges $f'$ of the guides F F³ project upward a distance slightly in excess of the flanges $f'$ of the guides F' F², so that the strips of backing will rest upon the flanges $f'$ of the two central guides F' F², and extend at their ends loosely against the flanges $f'$ of the guides F F³, whereby the latter flanges afford guides for the ends of the strips Z'. The bed frame E is then adjusted by turning the hand wheel $h^{13}$ to raise it or lower it, so that the tops of the flanges $f'$ of the guides F' F² will extend in a plane one-eighth of an inch (the thickness of the backing) below the plane of the under surfaces of the staple driving machines. The tops of the feed rollers carried by the shafts N' N² are in the plane of the tops of the central flanges $f'$, and being mounted upon the bed frame E will be adjusted by the movement of the latter. The angle iron bar H on the cleat guides are then adjusted by turning the hand wheels $f^8$ to raise or lower them to a plane two inches (the width of the cleats Z²) below the plane of the tops of the central guide flanges $f'$. The clinchers K are then adjusted by turning their adjusting wheels $e^3$, so that when raised by the operating beam L they will reach a plane exactly two and one-eighth inches below the under surfaces of the staple forming and driving machines. The stops V⁷ with their holders V⁶ are then adjusted along the rod V³, so as to extend above the cleat guides close to the flanges $f'$. When these adjustments have been made the machine is ready for operation. Cleats Z² are slid along the upper surfaces of the angle bars H between the clamping wheels $f^{35}$ and flanges $f'$ to the stops V⁷, as shown in Fig. 20, and strips of backing or veneering are placed upon the cleats between the guide flanges $f'$ of the bars F F³, as shown in Figs. 4, 19 and 20. The guide roller $p^{12}$ bears upon the upper surface of the backing to hold the latter down upon the cleats and flatten it out should it be warped. When the cleats and backing have been placed in position, as described, it has to be fed forward to the guide rollers W⁸ N¹², and this is done by the sliding frame P in the following manner: The operator turns the hand wheel E¹² to the left, causing the pinion E¹¹ to turn the shaft E³ and the sleeves E¹³ E²² carried thereby to the right in Fig. 2. In the initial movement of the shaft and sleeves the lug E¹⁴ on the sleeve E¹³ moves in the collar E¹⁵ from the stop E¹⁹ to the stop E¹⁸ without turning the arm E¹⁶; and the arm E²⁴ on the sleeve E²² moves in the collar E²⁵ from the stop E²⁸ to the stop E²⁷ without turning the arm E²⁶. In this initial movement of the shaft while the arm E²⁴ is moving between the stops E²⁸ E²⁷ the wheel E³¹ on the arm E²⁴ is swung in the path of the dotted arc in Fig. 25, causing it to engage the cam edge R⁸ on the crosshead R⁴ and move the latter to the yoke R³, and by means of the rods R⁵ and yoke R⁶ move the crank R' to rock the shaft R. As the shaft R is turned the arms S⁸ on the collars S⁴ are rocked downward and through the links R¹⁴ press the sliding bar R⁹ downward to force the pointed pins or spears T⁸ through the backing Z' and into the cleats Z². At the same time the cam projections S⁵ are caused to wipe across the cam surfaces S³ of the fingers S', depressing the latter against the resistance of the springs P⁷, until the points of the cam projections pass across the said cam surfaces S³ when the surfaces S⁷ of the cam projections S⁵ will be engaged by the upper surfaces of the fingers S' and the rock shaft R will be held by their engagement. The object of the cam projections S⁵ and spring operated fingers S' is to hold the shaft R against rocking except by the action of the wheel E³¹ against the cam R⁸. The engagement of the spears T⁸ with the backing and cleats causes the latter to be firmly gripped by the sliding frame. To prevent the sliding frame from being raised while the spears are being pressed into the material Z' Z², stops E³⁹ are provided upon the side bars E' E², having lugs E⁴⁰. The stops E³⁹ limit the forward movement of the sliding frame P and the lugs E⁴⁰ extend over the forward edge of the cross bar P³ to prevent the latter and frame P from being lifted, as indicated in Fig. 2. At the moment that the spears have been plunged the full distance downward the arm E²⁴ engages the stop E²⁷ on the collar E²⁵ and the lug E¹⁴ engages the stop E¹⁸, so that in the further turning of the shaft E³ the arms E¹⁶ E²⁶ will be swung downward and backward and move the sliding frame in the backward direction. As the frame is moved in the backward direction the engagement of the guide loops V⁹ with the shaft E⁸ causes the fingers to be raised, the arms V swinging on the pivots afforded by the shaft S. By the rise of the fingers V' the rod V³ and stops V⁷ are raised to move the latter out of the path of the cleats Z² and backing Z'. As the sliding frame is moved backward the side bars P' P² are slid in the recesses $c$ of the side bars E' E² of the raising and lowering bed frame. At the moment that the initial ends of the cleats Z² and backing Z' reach the feed rolls N¹² and upper feed roller W⁸, the cams $b^6$ engage the wheels W¹⁰ on the roller W⁸, and the cams $b^5$ engage the wheels W¹¹ on the rollers W⁹, and raise the latter slightly against the resistance of the springs W⁶, the roller W⁸ being thus lifted, the backing Z' may pass freely under it to the staple driving and forming machines. When the initial end of the material Z' Z² reaches the staple driving and forming mechanisms the machine is set in motion. This is accomplished, as before described, by turning the lever or handle $q^5$ to the right in Fig. 2, to produce engagement of the clutch members on the drive shaft B. In the first turning of the drive shaft B the operating rods $n$ of the stapling machines are plunged downward to drive staples already formed through the backing $Z'$ and into the cleats $Z^2$ over the strengthening wires $y$. In the down-strokes of the operating rod $n$ the clinchers K are raised against the under surfaces of the cleats, as before described, to receive the impact of the staple drivers. After the first staples have been driven the hand wheel $E^{12}$ is given a further turn to move the cleats and backing to the feed rollers $N^{13}$ $W^9$. While the next staples are being driven the hand wheel $E^{12}$ is turned to the right (in Fig. 2) or in the direction to move the sliding frame P forward to its initial position. In the first movement of the shaft $E^8$ the lug $E^{14}$ on the sleeve $E^{13}$ is turned from the stop $E^{18}$ to the stop $E^{19}$, and the arm $E^{24}$ is turned from the stop $E^{27}$ to the stop $E^{28}$. In the movement of the arm $E^{24}$ the wheel $E^{31}$ is moved across the cam edge $R^8$. It should be mentioned here that in the movement of the sliding frame between its initial and final positions it passes under the shaft $E^8$ causing the rods $R^5$ to be moved longitudinally upward and then downward through the guide openings $R^5$, the shaft R in the meantime being held against rocking by the engagement of the cams $S^5$ with the fingers $S'$, as before described. When the sliding frame is at the backward limit of its movement the rods $R^5$ extend backward and downward from the shaft $E^8$ instead of forward and downward, as shown in Fig. 25, but at about the same angle to the vertical plane as that there shown. As the shaft $E^8$ is turned as before described to carry the wheel $E^{31}$ across the cam surface $R^8$, in the movement of the hand wheel $E^{12}$ to the right, the cross head $R^4$ is moved to the yoke $R^3$ and the crank $R'$ and shaft R are rocked in the direction contrary to that at first described. In other words, as viewed in Figs. 20 and 22, the shaft R is rocked from right to left to raise the arms $S^8$ and sliding plates $R^9$ and withdraw the spears $T^8$ from the material $Z'$ $Z^2$; and wipe the cam projections $S^5$ across the fingers $S'$, so that the parts named will be in the relative positions shown in Fig. 20. In the further turning of the hand wheel $E^{12}$ the lug $E^{14}$ engages the stop $E^{19}$, and the arm $E^{24}$ engages the stop $E^{28}$, to slide the frame P in the forward direction. The hand wheel $E^{12}$ is turned, as stated, until the cam surfaces $b^6$ $b^5$ in the recesses $b$ cross the feed roller wheels $W^{10}$ $W^{11}$, respectively, to permit the feed rollers $W^8$ $W^9$ to drop upon the upper surface of the backing and clamp the latter against the feed rollers $N^{12}$ $N^{13}$. The sliding frame is moved backward no farther than this, which is about half way to its initial position, in order to maintain the lower ends of the stops $V^7$ above the surface of the backing $Z'$.

In every down-stroke of the staple machine operating bars $n$ staples are driven as described, and with every upstroke thereof to form new staples the bell crank lever $N^7$ is swung upward to cause the pawl $N^9$ to turn the ratchet wheel $N^6$ and gear $N^5$ to rotate the gears $N^2$ $N^3$ and turn the feed rollers $N^{12}$ $N^{13}$ to advance the material $Z'$ $Z^2$. At the same time strengthening wires $y$ are drawn through the stapling machines by the forward movement of the material $Z'$ $Z^2$. The feed mechanism for the material $Z'$ $Z^2$ is rendered readily adjustable by causing the operating rod $N^{10}$ to be pivotally connected to the arm $N^{11}$ of the bell crank lever $N^7$ at an elongated slot $x^3$ (Fig. 2), and in which it may be moved and tightened at will to increase or diminish the distance of throw of the pawl $N^9$. When the end of the material $Z'$ $Z^2$ reaches the staple driving mechanisms, and the final staples are driven it is necessary to sever the strengthening wires, feed them forward a short distance, and then stop the machine until material for a new blank Z is placed therein. As the final staples are being driven the operator turns the handle $l^{13}$ to move the wheel $l^{12}$ into the path of the descending cam $m'$. The engagement of the cam $m'$ with the wheel $l^{12}$ causes the shaft $l$ to be rocked, as before described, to raise the switch bar $k^4$ and move the switch fingers $n^6$ into the paths of the descending levers, before referred to, in the staple driving machines. The rocking of the shaft $l$ also causes the rods $q^{13}$ to be plunged upward, as before stated, to move the arm $q^{28}$ into the path of the wheel $r^{11}$ carried by the arm $r^{10}$, whereby the arm $q^{28}$ and rock shaft $p^{15}$ are turned to swing the yoke $q^{23}$ and disengage the clutch mechanism. The relative positions of the wheel $r^{11}$ and arm $q^{28}$ are such that the latter is turned to produce disengagement of the clutch just as the operating rods $n$ reach the limit of their up-stroke, and when the clutch members disengage, the operating shaft B ceases immediately to rotate. In the final movements of the operating rods $n$ the strengthening wires are severed and fed forward the distance of an inch, or thereabout, to afford the projecting ends shown in Fig. 65.

The wires $x'$, from which the staples are formed, and the strengthening wires $y$ are upon spools $a$ $a'$, respectively, which revolve upon shafts $a^2$ $a^2$, (see Fig. 32) journaled at opposite ends in brackets $a^3$. The brackets $a^3$ are supported upon a cross bar $A^7$ which extends between brackets $A^8$ on the side frames $A'$ $A^2$. Each bracket $a^3$ extends across the supporting bar $A^7$, the bearings for the shafts of the spools $a$ $a'$ being respectively on opposite sides of the bar $A^7$. The bar $A^7$ is provided midway between its side edges with a slot $A^9$ which extends nearly the full length of the said bar. Each bracket $a^3$ is upon a base plate $a^4$, which fits longitudinally upon the supporting bar $A^7$, and is provided with a slot $a^5$ which registers with the slot $A^9$ in the supporting bar. The bearings for the shafts $a^2$ are in recesses $a^6$ in the sides of the brackets, as shown in Figs. 31 and 33, and the base plates $a^4$ are adjustably secured in position upon the bar $A^7$ by means of nut bolts $a^7$ which pass through the slots $a^5$ $A^9$ (see Fig. 32). On the brackets $a^3$ are ears $a^8$ which afford bearings for shafts $a^9$ which extend parallel with the shafts $a^2$. On each shaft $a^9$ is a sleeve $a^{10}$ provided with arms $a^{11}$ between which is mounted a sheave $a^{12}$. Midway of the sheave $a^{12}$ on each sleeve $a^{10}$ is an upward extending finger $a^{13}$ provided with an eye $a^{14}$. Each sleeve also carries a lug $a^{15}$ which rests upon a spring stud $a^{16}$ housed in the bracket. On each sleeve are two lugs $a^{17}$ which are pressed against the flanges of the spools $a\,a'$ by the action of the spring studs $a^{16}$ to operate as brakes upon the spools. The wires carried by the spools extend through the eyes $a^{14}$ and over the sheaves $a^{12}$ down through the coincident slots $a^5$ $A^9$ to the staple forming and driving machines. When the intermittent grip mechanisms of those machines engage the wires to feed them forward they draw down upon the wires causing them to bear upon the sheaves $a^{12}$, and swing the arms $A^{10}$ downward to turn the sleeves $a^{10}$ to raise the lugs $a^{17}$ from engagement with the spools. Thus while the intermittent grip mechanisms are drawing upon the wires the spools will revolve freely, but just as soon as the intermittent grip mechanisms cease to draw upon the wires, the latter cease to draw upon the sheaves $a^{12}$, whereby the spring studs $a^{16}$ press the lugs or brakes $a^{17}$ against the spools and prevent their rotation to pay out the wire. In this way the tugs upon the wires produced by the intermittent grip mechanisms will not cause the spools to revolve any more than is necessary to pay out the wires as they are drawn by the intermittent grip mechanisms. Were it not for the brake mechanisms the spools might be so revolved on their bearings when a tug is given to the wires as to pay out more wire than is desired and permit the wires to become tangled between the spools and the intermittent grip mechanisms.

As explained at length in our aforesaid Letters Patent the intermittent grip mechanisms $n^2$ are only operated to feed forward strengthening wires when the latter are cut. While material for blanks Z is being advanced under the stapling machines, the wires $y$ are drawn through the stapling machines from their spools $a^2$, and require no other feed. When the wires $y$ are severed they have to be advanced across the under surfaces of the stapling machines to afford the projecting ends mentioned, and the switch mechanism brings into action the cutters, which sever the wire and also operate the intermittent grip mechanisms $n^2$. This construction belongs to the stapling machines and is therefore not shown more in detail in the present connection.

While we prefer to construct the machine as shown and described it may be modified with respect to details without departing from the spirit of our invention as defined by the claims.

What we claim as new, and desire to secure by Letters Patent, is—

1. In a machine for forming box blanks by fastening sheets and strengthening wires to reinforcing cleats, the combination of guides for the cleats, intermittent feed mechanism for advancing the cleats longitudinally in their guides and with a sheet through the machine, an intermittingly actuated staple driver adjacent to the path of each cleat, alternating in its action with said feed mechanism, to fasten the sheet, by successive operations, to the cleat, and means for guiding strengthening wires with the cleats and sheet across the staple drivers, substantially as and for the purpose set forth.

2. In a machine for forming box blanks by fastening sheets and strengthening wires to reinforcing cleats, the combination of outer and intermediate guides for the cleats, intermittent feed mechanism for advancing the cleats longitudinally in said guides with a sheet through the machine, an intermittingly-actuated staple driver adjacent to the path of each cleat alternating in its action with said feed mechanism to fasten the sheet and strengthening wires by successive operations to the cleat at intervals in the direction longitudinally of the cleat, and means for guiding strengthening wires with the sheet across the staple drivers, substantially as described.

3. In a machine for forming box blanks by fastening sheets and strengthening wires to reinforcing cleats, the combination of guides for the cleats, intermittent feed mechanism for advancing the cleats longitudinally in their guides and with a sheet through the machine, an intermittingly actuated staple driver above the path of each cleat, alternating in its action with said feed mechanism, to fasten the sheet, by successive operations, to the cleat at intervals in the direction longitudinally of the cleat means for guiding strengthening wires with the sheet across the staple drivers, and reciprocating clinchers below the paths of the said cleats co-operating with the staple drivers, substantially as described.

4. In a machine for forming box blanks by fastening sheets and strengthening wires to reinforcing cleats, the combination of guides for the cleats, intermittent feed mechanism for advancing the cleats longitudinally in their guides and with a sheet through the machine, an intermittingly actuated staple driver above the path of each cleat, an intermittingly actuated clincher below the path of each cleat, the said staple drivers and clinchers being adjustable with relation to each other and co-operating in their action to alternate with the said feed mechanism to fasten the sheet, by successive operations, to the cleats at intervals in the direction longitudinally of the cleats and means for guiding strengthening wires with the sheet across the staple drivers, substantially as described.

5. In a machine for forming box blanks by fastening sheets and strengthening wires to reinforcing cleats, the combination of laterally adjustable guides for the cleats, intermittent feed mechanism for advancing the cleats longitudinally in their guides and with a sheet through the machine, a laterally adjustable intermittingly actuated staple driver adjacent to the path of each cleat, alternating in its action with said feed mechanism, to fasten the sheet, by successive operations, to the cleat at intervals in the direction longitudinally of the cleat and means adjustable with the staple drivers for guiding strengthening wires with the sheet across the staple drivers, substantially as and for the purpose set forth.

6. In a machine for forming box blanks by fastening sheets and strengthening wires to reinforcing cleats, the combination of guides for the cleats, intermittent feed mechanism for advancing the cleats longitudinally in their guides and with a sheet through the machine, an intermittingly actuated staple driver and a guide for a strengthening wire adjacent to the path of each cleat, the staple drivers alternating in their action with the said feed mechanism to fasten the strengthening wires and sheet, by successive operations, to the cleat at intervals in the direction longitudinally of the cleat, substantially as described.

7. In a machine for forming box blanks by fastening sheets and strengthening wires to reinforcing cleats, the combination with intermittingly actuated staple drivers, of guides for the lateral edges of the sheet, guides for cleats intermediate of the said sheet-guides, guides for strengthening wires at the staple drivers and intermittent feed mechanism alternating in its action with the said staple drivers for advancing the cleats and sheets in their guides with the strengthening wires across the said staple drivers, substantially as and for the purpose set forth.

8. In a machine for forming box blanks by fastening sheets and strengthening wires to reinforcing cleats, the combination of intermittent feed mechanism for advancing the cleats longitudinally with a sheet through the machine, an intermittingly actuated staple driver adjacent to the path of each cleat, alternating in its action with said feed mechanism, to fasten the strengthening wires and sheet, by successive operations, to the cleat at intervals in the direction longitudinally of the cleat a strengthening wire guide at each staple driver, guides for the lateral edges of the sheet and guides for the cleats adjustable with relation to the said sheet guides according to the width of the cleats and thickness of the sheet, substantially as and for the purpose set forth.

9. In a machine for forming box blanks by fastening sheets and strengthening wires to reinforcing cleats, the combination of an adjustable bed frame, mounted in guides with means for raising and lowering it therein guides for the cleats on the said bed frame, intermittent feed mechanism for advancing the cleats longitudinally with the sheet through said guides, and intermittingly actuated staple driver adjacent to the path of each cleat alternating in its action with said feed mechanism, to fasten the strengthening wires and sheet, by successive operations, to the cleat at intervals in the direction longitudinally of the cleat and a strengthening wire guide at each staple driver, substantially as and for the purpose set forth.

10. In a machine for forming box blanks by fastening sheets and strengthening wires to reinforcing cleats, the combination with intermittingly actuated staple drivers, of guides for the cleats, guides for the strengthening wires and intermittingly actuated feed rollers for advancing the sheet, strengthening wires and cleats in their guides longitudinally across the said staple drivers, the said feed rollers alternating in their action with the said staple drivers, substantially as described.

11. In a machine for forming box blanks by fastening sheets to reinforcing cleats, the combination with intermittingly actuated staple drivers, of guides for the sheet and cleats, intermittent feed rolls, alternating in their action with the said staple drivers to advance the sheet and cleats in their guides longitudinally across the staple drivers, and a sliding frame, provided with means for gripping the cleats through the sheets, and operative to engage the same, when initially fed to the machine, slide them to the said feed rolls, hold them together until the first staples are driven and then release them, substantially as described.

12. In a machine for forming box blanks by fastening sheets and strengthening wires to reinforcing cleats, the combination of guides for the cleats, intermittent feed mechanism for advancing the cleats longitudinally with a sheet through the machine, a series of intermittingly actuated staple forming and driving machines, alternating in their action with the said feed mechanism, disposed above the path of the sheet and cleats and in a horizontal line at right-angles to said path, and means for guiding strengthening wires across the staple drivers, whereby the strengthening wires and sheet, by successive operations of the staple drivers, are fastened to the cleats at intervals in the direction longitudinally of the cleats, substantially as described.

13. In a machine for forming box blanks by fastening sheets and strengthening wires to reinforcing cleats, the combination of guides for the cleats, intermittent feed mechanism for advancing the cleats longitudinally with a sheet through the machine, an intermittingly actuated staple driver adjacent to the path of each cleat, alternating in its action with said feed mechanism, and means for severing and initially advancing a strengthening wire across each staple driver before the first staple is driven into a cleat, substantially as and for the purpose set forth.

14. The combination with the main-frame, of a driver and drive-shaft mounted thereon, clutch mechanism between the said driver and shaft, shipping-mechanism on the frame for engaging and releasing the clutch members to start and stop the machine, staple forming and driving machines mounted on the frame and actuated from the said drive-shaft, guides at said staple machines for strengthening wires $y$, strengthening-wire engaging and advancing means, and strengthening-wire severing means at the said guides normally inactive and brought into action by movement of said shipping mechanism, to disengage the said clutch-members, and a feed for the material to be stapled actuated from the said drive-shaft to advance the material intermittingly across the said staple-machines, substantially as described.

15. In a machine of the character described, the combination with the main-frame, drive-shaft, staple forming and driving machines mounted on the frame and actuated from the drive-shaft, strengthening-wire guides, and intermittent feed for the material to be stapled, of rotary spools on the main-frame for the strengthening-wires $y$ and staple-wires $x$, and brakes for the said spools engaged by said wires and operating when the wires are at rest normally to engage the spools, and under pressure against them exerted by the wires when drawn upon, to release the spools, substantially as and for the purpose set forth.

THURSTON L. KNUDTSON.
JACOB UHRI.

In presence of—
M. J. FROST,
W. N. WILLIAMS.